(12) United States Patent
Amidon et al.

(10) Patent No.: US 8,725,740 B2
(45) Date of Patent: May 13, 2014

(54) ACTIVE PLAYLIST HAVING DYNAMIC MEDIA ITEM GROUPS

(75) Inventors: Christopher M. Amidon, Apex, NC (US); Gary W. Black, Cary, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 524 days.

(21) Appl. No.: 12/053,782

(22) Filed: Mar. 24, 2008

(65) Prior Publication Data

US 2009/0240732 A1    Sep. 24, 2009

(51) Int. Cl.
*G06F 7/00*    (2006.01)
*G06F 17/00*   (2006.01)

(52) U.S. Cl.
USPC .......................................................... 707/748

(58) Field of Classification Search
USPC .......................... 707/747, 736, 916, 999.107
See application file for complete search history.

(56) References Cited

U.S. PATENT DOCUMENTS

| | | |
|---|---|---|
| 4,870,579 A | 9/1989 | Hey |
| 5,168,481 A | 12/1992 | Culbertson et al. |
| 5,262,875 A | 11/1993 | Mincer et al. |
| 5,440,334 A | 8/1995 | Walters et al. |
| 5,616,876 A | 4/1997 | Cluts |
| 5,621,456 A | 4/1997 | Florin et al. |
| 5,621,546 A | 4/1997 | Klassen et al. |
| 5,625,608 A | 4/1997 | Grewe et al. |
| 5,710,970 A | 1/1998 | Walters et al. |
| 5,771,778 A | 6/1998 | MacLean, IV |
| 5,787,264 A | 7/1998 | Christiansen et al. |
| 5,790,426 A | 8/1998 | Robinson |
| 5,796,727 A | 8/1998 | Harrison |
| 5,845,065 A | 12/1998 | Conte et al. |
| 5,884,046 A | 3/1999 | Antonov |
| 5,884,282 A | 3/1999 | Robinson |

(Continued)

FOREIGN PATENT DOCUMENTS

| | | |
|---|---|---|
| CN | 1208930 | 2/1999 |
| EP | 898278 | 2/1999 |

(Continued)

OTHER PUBLICATIONS

"Pandora Internet Radio—Find New Music, Listen to Free Web Radio," http://www.pandora.com/, copyright 2005-2007 Pandora Media, Inc., printed Feb. 7, 2007, 1 page.

(Continued)

*Primary Examiner* — Usmaan Saeed
*Assistant Examiner* — Paul Kim

(57) ABSTRACT

Systems and methods are provided for creation and management of an active playlist having dynamic media item groups. A number of media items to be used for the active playlist are first identified and classified into one or more media item groups based on a primary criterion and, optionally, one or more secondary criteria to provide an underlying pool of media items for the active playlist. The active playlist is then populated with media items from the underlying pool of media items. More specifically, the active playlist is divided into media item groups corresponding to those in the underlying pool of media items. Each media item group in the active playlist is populated with a predefined number of the media items in the corresponding media item group in the underlying pool of media items. Thereafter, the media items in the media item groups of the active playlist are dynamically updated.

16 Claims, 13 Drawing Sheets

(56) References Cited

U.S. PATENT DOCUMENTS

| | | |
|---|---|---|
| 5,903,901 A | 5/1999 | Kawakura et al. |
| 5,949,776 A | 9/1999 | Mahany et al. |
| 5,956,027 A | 9/1999 | Krishnamurthy |
| 5,963,916 A | 10/1999 | Kaplan |
| 5,986,200 A | 11/1999 | Curtin |
| 5,996,022 A | 11/1999 | Krueger et al. |
| 6,041,311 A | 3/2000 | Chislenko et al. |
| 6,064,379 A | 5/2000 | DeMoney |
| 6,088,722 A | 7/2000 | Herz et al. |
| 6,130,892 A | 10/2000 | Short et al. |
| 6,134,552 A | 10/2000 | Fritz et al. |
| 6,192,340 B1 | 2/2001 | Abecassis |
| 6,195,657 B1 | 2/2001 | Rucker et al. |
| 6,248,946 B1 | 6/2001 | Dwek |
| 6,266,649 B1 | 7/2001 | Linden et al. |
| 6,314,420 B1 | 11/2001 | Lang et al. |
| 6,317,722 B1 | 11/2001 | Jacobi et al. |
| 6,353,823 B1 | 3/2002 | Kumar |
| 6,363,434 B1 | 3/2002 | Eytchison |
| 6,388,714 B1 | 5/2002 | Schein et al. |
| 6,389,467 B1 | 5/2002 | Eyal |
| 6,438,579 B1 | 8/2002 | Hosken |
| 6,456,234 B1 | 9/2002 | Johnson |
| 6,484,199 B2 | 11/2002 | Eyal |
| 6,487,622 B1 | 11/2002 | Coskrey, IV et al. |
| 6,498,955 B1 | 12/2002 | McCarthy et al. |
| 6,505,160 B1 | 1/2003 | Levy et al. |
| 6,519,648 B1 | 2/2003 | Eyal |
| 6,526,411 B1 | 2/2003 | Ward |
| 6,553,404 B2 | 4/2003 | Stern |
| 6,567,797 B1 | 5/2003 | Schuetze et al. |
| 6,587,127 B1 | 7/2003 | Leeke et al. |
| 6,587,850 B2 | 7/2003 | Zhai |
| 6,605,770 B2 | 8/2003 | Yamane et al. |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,657,116 B1 | 12/2003 | Gunnerson |
| 6,662,231 B1 | 12/2003 | Drosset et al. |
| 6,670,537 B2 | 12/2003 | Hughes et al. |
| 6,675,015 B1 | 1/2004 | Martini et al. |
| 6,675,268 B1 | 1/2004 | DeKoning et al. |
| 6,694,482 B1 | 2/2004 | Arellano et al. |
| 6,721,489 B1 | 4/2004 | Benyamin et al. |
| 6,721,741 B1 | 4/2004 | Eyal et al. |
| 6,735,628 B2 | 5/2004 | Eyal |
| 6,757,517 B2 | 6/2004 | Chang |
| 6,757,691 B1 | 6/2004 | Welsh et al. |
| 6,801,909 B2 | 10/2004 | Delgado et al. |
| 6,853,841 B1 | 2/2005 | St. Pierre |
| 6,865,565 B2 | 3/2005 | Rainsberger et al. |
| 6,865,600 B1 | 3/2005 | Brydon et al. |
| 6,876,642 B1 | 4/2005 | Adams |
| 6,882,299 B1 | 4/2005 | Allport |
| 6,904,264 B1 | 6/2005 | Frantz |
| 6,912,528 B2 | 6/2005 | Homer |
| 6,933,433 B1 | 8/2005 | Porteus et al. |
| 6,937,860 B2 | 8/2005 | Jahn |
| 6,941,275 B1 | 9/2005 | Swierczek |
| 6,941,324 B2 | 9/2005 | Plastina et al. |
| 6,946,988 B2 | 9/2005 | Edwards et al. |
| 6,947,571 B1 | 9/2005 | Rhoads et al. |
| 6,947,922 B1 | 9/2005 | Glance |
| 6,954,443 B2 | 10/2005 | Forstadius |
| 6,970,703 B2 | 11/2005 | Fuchs et al. |
| 6,975,266 B2 | 12/2005 | Abraham et al. |
| 6,976,228 B2 | 12/2005 | Bernhardson |
| 6,982,780 B2 | 1/2006 | Morley et al. |
| 6,987,221 B2 | 1/2006 | Platt |
| 6,990,453 B2 | 1/2006 | Wang et al. |
| 6,990,497 B2 | 1/2006 | O'Rourke et al. |
| 6,993,532 B1 * | 1/2006 | Platt et al. ............ 707/736 |
| 7,000,188 B1 | 2/2006 | Eustace |
| 7,010,537 B2 | 3/2006 | Eyal et al. |
| 7,013,301 B2 | 3/2006 | Holm et al. |
| 7,020,710 B2 | 3/2006 | Weber et al. |
| 7,028,082 B1 | 4/2006 | Rosenberg et al. |
| 7,035,871 B2 | 4/2006 | Hunt et al. |
| 7,035,912 B2 | 4/2006 | Arteaga |
| 7,043,477 B2 | 5/2006 | Mercer et al. |
| 7,047,092 B2 | 5/2006 | Wimsatt |
| 7,047,315 B1 | 5/2006 | Srivastava |
| 7,047,406 B2 | 5/2006 | Schleicher et al. |
| D524,251 S | 7/2006 | Lim et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,081,579 B2 | 7/2006 | Alcalde et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,134,040 B2 | 11/2006 | Ayres |
| 7,139,757 B1 | 11/2006 | Apollonsky et al. |
| 7,170,400 B2 | 1/2007 | Cowelchuk et al. |
| 7,171,018 B2 | 1/2007 | Rhoads et al. |
| 7,171,174 B2 | 1/2007 | Ellis et al. |
| 7,177,872 B2 | 2/2007 | Schwesig et al. |
| 7,187,947 B1 | 3/2007 | White et al. |
| 7,218,611 B2 | 5/2007 | Mimura et al. |
| 7,222,187 B2 | 5/2007 | Yeager et al. |
| 7,240,106 B2 | 7/2007 | Cochran et al. |
| 7,248,893 B2 | 7/2007 | Christensen et al. |
| 7,249,367 B2 | 7/2007 | Bove, Jr. et al. |
| 7,260,638 B2 | 8/2007 | Crosbie |
| 7,263,710 B1 | 8/2007 | Hummel, Jr. et al. |
| 7,269,854 B2 | 9/2007 | Simmons et al. |
| 7,277,955 B2 | 10/2007 | Elliott |
| 7,283,992 B2 | 10/2007 | Liu et al. |
| 7,292,588 B2 | 11/2007 | Milley et al. |
| 7,296,032 B1 | 11/2007 | Beddow |
| D559,197 S | 1/2008 | Lim et al. |
| 7,325,043 B1 | 1/2008 | Rosenberg et al. |
| 7,340,455 B2 | 3/2008 | Platt et al. |
| 7,340,481 B1 | 3/2008 | Baer et al. |
| 7,340,768 B2 | 3/2008 | Rosenberger |
| 7,343,160 B2 | 3/2008 | Morton |
| 7,373,109 B2 | 5/2008 | Pohja et al. |
| 7,378,903 B2 | 5/2008 | Bates |
| D575,800 S | 8/2008 | Kusano et al. |
| D575,801 S | 8/2008 | Kusano et al. |
| 7,437,364 B1 | 10/2008 | Fredricksen et al. |
| D582,429 S | 12/2008 | Kusano et al. |
| 7,463,890 B2 | 12/2008 | Herz et al. |
| 7,468,934 B1 | 12/2008 | Janik |
| 7,472,353 B1 | 12/2008 | Wolff et al. |
| 7,496,623 B2 | 2/2009 | Szeto et al. |
| 7,509,291 B2 | 3/2009 | McBride et al. |
| 7,512,702 B1 | 3/2009 | Srivastava et al. |
| 7,516,212 B2 | 4/2009 | Nguyen et al. |
| 7,525,289 B2 | 4/2009 | Janik et al. |
| 7,548,915 B2 | 6/2009 | Ramer et al. |
| 7,571,014 B1 | 8/2009 | Lambourne et al. |
| 7,590,546 B2 | 9/2009 | Chuang |
| 7,594,246 B1 | 9/2009 | Billmaier et al. |
| 7,613,736 B2 | 11/2009 | Hicken |
| 7,614,006 B2 | 11/2009 | Molander |
| 7,643,894 B2 | 1/2010 | Braithwaite et al. |
| 7,652,844 B2 | 1/2010 | Edwards et al. |
| 7,660,601 B2 | 2/2010 | Janik et al. |
| 7,668,964 B2 | 2/2010 | Millington |
| 7,676,753 B2 | 3/2010 | Bedingfield |
| 7,680,959 B2 | 3/2010 | Svendsen |
| 7,696,816 B2 | 4/2010 | Bates |
| 7,720,871 B2 | 5/2010 | Rogers et al. |
| 7,730,216 B1 | 6/2010 | Issa et al. |
| 7,742,606 B2 | 6/2010 | Kreifeldt et al. |
| 7,768,234 B2 | 8/2010 | Janik et al. |
| 7,772,479 B2 | 8/2010 | Kobayashi |
| 7,786,705 B2 | 8/2010 | Janik et al. |
| 7,792,311 B1 | 9/2010 | Holmgren et al. |
| 7,805,129 B1 | 9/2010 | Issa et al. |
| 7,805,682 B1 | 9/2010 | Lambourne |
| 7,904,579 B2 | 3/2011 | Janik et al. |

(56) References Cited

U.S. PATENT DOCUMENTS

| | | |
|---|---|---|
| 7,920,824 B2 | 4/2011 | Janik et al. |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2001/0029192 A1 | 10/2001 | Oh |
| 2001/0039659 A1 | 11/2001 | Simmons et al. |
| 2001/0053994 A1 | 12/2001 | Atcheson et al. |
| 2002/0007418 A1 | 1/2002 | Hegde et al. |
| 2002/0013852 A1 | 1/2002 | Janik |
| 2002/0023084 A1 | 2/2002 | Eyal et al. |
| 2002/0032019 A1 | 3/2002 | Marks et al. |
| 2002/0033844 A1 | 3/2002 | Levy et al. |
| 2002/0049760 A1 | 4/2002 | Scott et al. |
| 2002/0052207 A1 | 5/2002 | Hunzinger |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138630 A1 | 9/2002 | Solomon et al. |
| 2002/0138836 A1 | 9/2002 | Zimmerman |
| 2002/0143976 A1 | 10/2002 | Barker et al. |
| 2002/0144259 A1 | 10/2002 | Gutta et al. |
| 2002/0151327 A1 | 10/2002 | Levitt |
| 2002/0165793 A1 | 11/2002 | Brand et al. |
| 2002/0166123 A1 | 11/2002 | Schrader et al. |
| 2002/0168938 A1 | 11/2002 | Chang |
| 2002/0173273 A1 | 11/2002 | Spurgat et al. |
| 2002/0174243 A1 | 11/2002 | Spurgat et al. |
| 2002/0174426 A1 | 11/2002 | Gutta et al. |
| 2002/0178057 A1 | 11/2002 | Bertram et al. |
| 2002/0194260 A1 | 12/2002 | Headley et al. |
| 2002/0194619 A1 | 12/2002 | Chang et al. |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0014759 A1 | 1/2003 | Van Stam |
| 2003/0018799 A1 | 1/2003 | Eyal |
| 2003/0022675 A1 | 1/2003 | Mergler |
| 2003/0033420 A1 | 2/2003 | Eyal et al. |
| 2003/0046399 A1 | 3/2003 | Boulter et al. |
| 2003/0050062 A1 | 3/2003 | Chen et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi |
| 2003/0086699 A1 | 5/2003 | Benyamin et al. |
| 2003/0089218 A1 | 5/2003 | Gang et al. |
| 2003/0093790 A1 | 5/2003 | Logan et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0147624 A1 | 8/2003 | Trajkovic et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0172213 A1 | 9/2003 | Garcia et al. |
| 2003/0182315 A1 | 9/2003 | Plastina et al. |
| 2003/0191753 A1 | 10/2003 | Hoch |
| 2003/0204439 A1 | 10/2003 | Cullen, III |
| 2003/0217102 A1 | 11/2003 | Jystad et al. |
| 2003/0225834 A1 | 12/2003 | Lee et al. |
| 2003/0227478 A1 | 12/2003 | Chatfield |
| 2003/0229537 A1 | 12/2003 | Dunning et al. |
| 2003/0229549 A1 | 12/2003 | Wolinsky et al. |
| 2003/0229900 A1 | 12/2003 | Reisman |
| 2003/0233650 A1 | 12/2003 | Zaner et al. |
| 2003/0236582 A1 | 12/2003 | Zamir et al. |
| 2003/0236843 A1 | 12/2003 | Weber et al. |
| 2003/0237093 A1 | 12/2003 | Marsh |
| 2004/0002938 A1 | 1/2004 | Deguchi |
| 2004/0003392 A1 | 1/2004 | Trajkovic et al. |
| 2004/0017997 A1 | 1/2004 | Cowgill |
| 2004/0019497 A1 | 1/2004 | Volk et al. |
| 2004/0031058 A1 | 2/2004 | Reisman |
| 2004/0034441 A1 | 2/2004 | Eaton et al. |
| 2004/0055014 A1 | 3/2004 | Edelson |
| 2004/0057348 A1 | 3/2004 | Shteyn et al. |
| 2004/0073919 A1 | 4/2004 | Gutta |
| 2004/0078382 A1 | 4/2004 | Mercer et al. |
| 2004/0083487 A1 | 4/2004 | Collens et al. |
| 2004/0086120 A1 | 5/2004 | Akins, III et al. |
| 2004/0088271 A1 | 5/2004 | Cleckler |
| 2004/0091235 A1 | 5/2004 | Gutta |
| 2004/0107219 A1 | 6/2004 | Rosenberger |
| 2004/0107821 A1 | 6/2004 | Alcalde et al. |
| 2004/0111360 A1 | 6/2004 | Albanese |
| 2004/0111492 A1 | 6/2004 | Nakahara et al. |
| 2004/0119894 A1 | 6/2004 | Higgins et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0148393 A1 | 7/2004 | Breiter et al. |
| 2004/0160307 A1 | 8/2004 | Saikkonen |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0181604 A1 | 9/2004 | Immonen |
| 2004/0186733 A1 | 9/2004 | Loomis et al. |
| 2004/0199527 A1 | 10/2004 | Morain et al. |
| 2004/0205028 A1 | 10/2004 | Verosub et al. |
| 2004/0215793 A1 | 10/2004 | Ryan et al. |
| 2004/0216108 A1 | 10/2004 | Robbin |
| 2004/0221246 A1 | 11/2004 | Emerson et al. |
| 2004/0224638 A1 | 11/2004 | Fadell et al. |
| 2004/0225519 A1 | 11/2004 | Martin |
| 2004/0243672 A1 | 12/2004 | Markki et al. |
| 2004/0246372 A1 | 12/2004 | Megeid |
| 2004/0249708 A1 | 12/2004 | Jacobs et al. |
| 2004/0252604 A1 | 12/2004 | Johnson et al. |
| 2004/0254911 A1 | 12/2004 | Grasso et al. |
| 2004/0255340 A1 | 12/2004 | Logan |
| 2004/0260407 A1 | 12/2004 | Wimsatt |
| 2004/0260786 A1 | 12/2004 | Barile |
| 2004/0267604 A1 | 12/2004 | Gross |
| 2004/0267899 A1 | 12/2004 | Rahman et al. |
| 2005/0020223 A1 | 1/2005 | Ellis et al. |
| 2005/0021369 A1 | 1/2005 | Cohen et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0026559 A1 | 2/2005 | Khedouri |
| 2005/0033780 A1 | 2/2005 | Simelius et al. |
| 2005/0038819 A1 | 2/2005 | Hicken et al. |
| 2005/0038876 A1 | 2/2005 | Chaudhuri |
| 2005/0055716 A1 | 3/2005 | Louie et al. |
| 2005/0059379 A1 | 3/2005 | Sovio et al. |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071881 A1 | 3/2005 | Deshpande |
| 2005/0091107 A1 | 4/2005 | Blum |
| 2005/0091595 A1 | 4/2005 | Shappell et al. |
| 2005/0091693 A1 | 4/2005 | Amine et al. |
| 2005/0108430 A1 | 5/2005 | Howarth et al. |
| 2005/0110619 A1 | 5/2005 | Klein |
| 2005/0113946 A9 | 5/2005 | Janik |
| 2005/0120053 A1 | 6/2005 | Watson |
| 2005/0120373 A1 | 6/2005 | Thomas et al. |
| 2005/0125222 A1 | 6/2005 | Brown et al. |
| 2005/0131866 A1 | 6/2005 | Badros |
| 2005/0154608 A1 | 7/2005 | Paulson et al. |
| 2005/0154747 A1 | 7/2005 | Kii et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0160270 A1 | 7/2005 | Goldberg et al. |
| 2005/0165888 A1 | 7/2005 | Elliott |
| 2005/0166245 A1 | 7/2005 | Shin et al. |
| 2005/0187976 A1 | 8/2005 | Goodman et al. |
| 2005/0197961 A1 | 9/2005 | Miller et al. |

(56) References Cited

U.S. PATENT DOCUMENTS

| | | |
|---|---|---|
| 2005/0203801 A1 | 9/2005 | Morgenstern et al. |
| 2005/0210507 A1 | 9/2005 | Hawkins et al. |
| 2005/0228830 A1 | 10/2005 | Plastina et al. |
| 2005/0234995 A1 | 10/2005 | Plastina et al. |
| 2005/0240494 A1 | 10/2005 | Cue et al. |
| 2005/0245233 A1 | 11/2005 | Anderson |
| 2005/0246391 A1 | 11/2005 | Gross |
| 2005/0251453 A1 | 11/2005 | Lu |
| 2005/0251455 A1 | 11/2005 | Boesen |
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0256756 A1 | 11/2005 | Lam et al. |
| 2005/0256866 A1 | 11/2005 | Lu et al. |
| 2005/0262204 A1 | 11/2005 | Szeto et al. |
| 2005/0267944 A1 | 12/2005 | Little, II |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0039303 A1 | 2/2006 | Singer et al. |
| 2006/0039304 A1 | 2/2006 | Singer et al. |
| 2006/0048059 A1 | 3/2006 | Etkin |
| 2006/0059260 A1 | 3/2006 | Kelly et al. |
| 2006/0064716 A1 | 3/2006 | Sull et al. |
| 2006/0074750 A1 | 4/2006 | Clark et al. |
| 2006/0078112 A1 | 4/2006 | Meyers |
| 2006/0083119 A1 | 4/2006 | Hayes |
| 2006/0085383 A1 | 4/2006 | Mantle et al. |
| 2006/0085821 A9 | 4/2006 | Simmons et al. |
| 2006/0087926 A1 | 4/2006 | Hwang |
| 2006/0095634 A1 | 5/2006 | Meyer |
| 2006/0100924 A1 | 5/2006 | Tevanian, Jr. |
| 2006/0112082 A1 | 5/2006 | Platt et al. |
| 2006/0126135 A1 | 6/2006 | Stevens et al. |
| 2006/0130120 A1 | 6/2006 | Brandyberry et al. |
| 2006/0135059 A1 | 6/2006 | Hill |
| 2006/0136572 A1 | 6/2006 | Stern et al. |
| 2006/0143236 A1 | 6/2006 | Wu |
| 2006/0146765 A1 | 7/2006 | Van De Sluis et al. |
| 2006/0156242 A1 | 7/2006 | Bedingfield |
| 2006/0167576 A1 | 7/2006 | Rosenberg |
| 2006/0167991 A1 | 7/2006 | Heikes et al. |
| 2006/0168126 A1 | 7/2006 | Costa-Requena et al. |
| 2006/0168264 A1 | 7/2006 | Baba et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0212442 A1* | 9/2006 | Conrad et al. .................. 707/5 |
| 2006/0212444 A1* | 9/2006 | Handman et al. ............... 707/5 |
| 2006/0212478 A1 | 9/2006 | Plastina et al. |
| 2006/0218180 A1 | 9/2006 | Bodlaender et al. |
| 2006/0218187 A1 | 9/2006 | Plastina et al. |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0256669 A1 | 11/2006 | Sakuma et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackson |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0287746 A1 | 12/2006 | Braithwaite et al. |
| 2006/0288041 A1 | 12/2006 | Plastina et al. |
| 2006/0293909 A1 | 12/2006 | Miyajima et al. |
| 2006/0294201 A1 | 12/2006 | Kito et al. |
| 2006/0294212 A1 | 12/2006 | Kikkawa et al. |
| 2007/0001824 A1 | 1/2007 | Fell |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0025194 A1* | 2/2007 | Morse et al. ................... 369/30.1 |
| 2007/0028171 A1 | 2/2007 | MacLaurin |
| 2007/0038672 A1 | 2/2007 | Plastina et al. |
| 2007/0038999 A1 | 2/2007 | Millington |
| 2007/0043766 A1 | 2/2007 | Nicholas et al. |
| 2007/0044010 A1 | 2/2007 | Sull et al. |
| 2007/0061497 A1 | 3/2007 | Takatsuka |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein |
| 2007/0083471 A1 | 4/2007 | Robbin et al. |
| 2007/0083553 A1 | 4/2007 | Minor |
| 2007/0083911 A1 | 4/2007 | Madden et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0168254 A1 | 7/2007 | Steelberg et al. |
| 2007/0168388 A1 | 7/2007 | Plastina et al. |
| 2007/0180063 A1 | 8/2007 | Qureshey et al. |
| 2007/0198485 A1 | 8/2007 | Ramer et al. |
| 2007/0199014 A1 | 8/2007 | Clark et al. |
| 2007/0208771 A1 | 9/2007 | Platt |
| 2007/0214182 A1 | 9/2007 | Rosenberg |
| 2007/0214259 A1 | 9/2007 | Ahmed et al. |
| 2007/0219996 A1 | 9/2007 | Jarvinen |
| 2007/0220081 A1 | 9/2007 | Hyman |
| 2007/0220552 A1 | 9/2007 | Juster et al. |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0247979 A1 | 10/2007 | Brillon et al. |
| 2007/0255752 A1 | 11/2007 | Miller |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |

(56) References Cited

U.S. PATENT DOCUMENTS

| | | |
|---|---|---|
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016196 A1 | 1/2008 | MacMillan et al. |
| 2008/0016205 A1 | 1/2008 | Svendsen |
| 2008/0032723 A1 | 2/2008 | Rosenberg |
| 2008/0033821 A1 | 2/2008 | Jacobi et al. |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052630 A1 | 2/2008 | Rosenbaum et al. |
| 2008/0059576 A1 | 3/2008 | Liu et al. |
| 2008/0059992 A1 | 3/2008 | Amidon et al. |
| 2008/0091771 A1 | 4/2008 | Allen et al. |
| 2008/0109095 A1 | 5/2008 | Braithwaite et al. |
| 2008/0114481 A1 | 5/2008 | Braithwaite et al. |
| 2008/0120501 A1 | 5/2008 | Jannink et al. |
| 2008/0125889 A1 | 5/2008 | Atherton et al. |
| 2008/0133520 A1 | 6/2008 | Hempleman et al. |
| 2008/0133601 A1 | 6/2008 | Martin Cervera et al. |
| 2008/0133759 A1 | 6/2008 | Weel |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0176511 A1 | 7/2008 | Tan et al. |
| 2008/0189336 A1 | 8/2008 | Prihodko |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208379 A1 | 8/2008 | Weel |
| 2008/0208823 A1 | 8/2008 | Hicken |
| 2008/0209013 A1 | 8/2008 | Weel |
| 2008/0228945 A1 | 9/2008 | Yoon et al. |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0263582 A1 | 10/2008 | Okamoto et al. |
| 2008/0270561 A1 | 10/2008 | Tang et al. |
| 2008/0276279 A1 | 11/2008 | Gossweiler et al. |
| 2008/0281867 A1 | 11/2008 | Kendall et al. |
| 2008/0288375 A1 | 11/2008 | Uhrig et al. |
| 2008/0288588 A1 | 11/2008 | Andam et al. |
| 2008/0301118 A1 | 12/2008 | Chien et al. |
| 2008/0306826 A1 | 12/2008 | Kramer et al. |
| 2008/0319833 A1 | 12/2008 | Svendsen |
| 2009/0006368 A1 | 1/2009 | Mei et al. |
| 2009/0006374 A1 | 1/2009 | Kim et al. |
| 2009/0007198 A1 | 1/2009 | Lavender et al. |
| 2009/0042545 A1 | 2/2009 | Avital et al. |
| 2009/0055385 A1 | 2/2009 | Jeon et al. |
| 2009/0055467 A1 | 2/2009 | Petersen |
| 2009/0069911 A1 | 3/2009 | Stefik |
| 2009/0069912 A1 | 3/2009 | Stefik |
| 2009/0070350 A1 | 3/2009 | Wang |
| 2009/0077124 A1 | 3/2009 | Spivack et al. |
| 2009/0077160 A1 | 3/2009 | Svendsen et al. |
| 2009/0077220 A1 | 3/2009 | Svendsen et al. |
| 2009/0083541 A1 | 3/2009 | Levine |
| 2009/0085724 A1 | 4/2009 | Naressi et al. |
| 2009/0089288 A1 | 4/2009 | Petersen |
| 2009/0129671 A1 | 5/2009 | Hu et al. |
| 2009/0132527 A1 | 5/2009 | Sheshagiri et al. |
| 2009/0164641 A1 | 6/2009 | Rogers et al. |
| 2009/0177301 A1 | 7/2009 | Hayes |
| 2009/0193472 A1 | 7/2009 | Braithwaite et al. |
| 2009/0315670 A1 | 12/2009 | Naressi et al. |
| 2010/0172512 A1 | 7/2010 | Braithwaite et al. |
| 2011/0026727 A1 | 2/2011 | Braithwaite et al. |
| 2011/0044468 A1 | 2/2011 | Braithwaite et al. |
| 2011/0044469 A1 | 2/2011 | Braithwaite et al. |

FOREIGN PATENT DOCUMENTS

| | | |
|---|---|---|
| EP | 0984584 A1 | 3/2000 |
| EP | 1536352 | 6/2005 |
| EP | 1791130 A2 | 5/2007 |
| EP | 1835455 | 9/2007 |
| GB | 2372850 | 9/2002 |
| GB | 2397205 | 7/2004 |
| WO | WO 01/84353 | 11/2001 |
| WO | WO 02/21335 | 3/2002 |
| WO | 03/019560 A2 | 3/2003 |
| WO | WO 2004/017178 | 2/2004 |
| WO | WO 2004/043064 | 5/2004 |
| WO | 2004071094 A1 | 8/2004 |
| WO | WO 2005/026916 | 3/2005 |
| WO | 2005/071571 A1 | 8/2005 |
| WO | 2005071569 A1 | 8/2005 |
| WO | 2006035399 A1 | 4/2006 |
| WO | WO 2006/075032 | 7/2006 |
| WO | 2006091251 A1 | 8/2006 |
| WO | 2006/126135 A2 | 11/2006 |
| WO | 2007092053 A1 | 8/2007 |

OTHER PUBLICATIONS

"MyStrands Labs: Patent-pending Technologies," http://labs.mystrands.com/patents.html, printed Feb. 7, 2007, 5 pages.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"Billboard Music Charts—Latest Music News—Music Videos," http://www.billboard.com/bbcom/index.jsp, printed Feb. 7, 2007, 2 pages.

"CNN.com—Breaking News, U.S., World, Weather, Entertainment & Video News," http://www.cnn.com, copyright 2007 Cable News Network LP, LLLP, printed Feb. 7, 2007, 3 pages.

"InferNote is an exploration tool for your music collection," http://www.itweaks.com/infdoc/index.html, copyright 2004 otherslikeyou.com Inc., printed Feb. 7, 2007, 13 pages.

"Rhapsody—Full-length music, videos and more—Free," http://www.rhapsody.com/welcome.html, copyright 1948-2007 Muze Inc., copyright 2001-2007 Listen.com, printed Feb. 7, 2007, 1 page.

"National and Local Weather Forecast, Radar, Map and Report," http://www.weather.com/, copyright 1995-2007 The Weather Channel Interactive, Inc., printed Feb. 7, 2007, 3 pages.

Goombah—Preview, http://www.goombah.com/preview.html, printed Jan. 8, 2008, 5 pages.

"Apple'iPod + iTunes," http://www.apple.com/itunes/, copyright 2007 Paramount Pictures, printed Feb. 7, 2007, 2 pages.

"Roxio The Boom Box Music and recording reviews—CNET Reviews," http://reviews.cnet.com/music-and-recording/roxio-the-boom-box/4505-3669_7-3141440 . . . , printed Nov. 15, 2007, 4 pages.

"Napster.co.uk—Napster To Go," http://www.napster.co.uk/ntg.html, copyright 2003-2007 Napster, LLC, printed Nov. 15, 2007, 2 pages.

"Start Listening with Last.fm," http://www.last.fm/, 1 page.

"MSN—Music," http://music.msn.com/help/sync, copyright 2007 Microsoft, printed Nov. 16, 2007, 1 page.

Jeff Mascia et al., "Lifetrak: Music in Tune With Your Life," copyright 2006 ACM, 11 pages.

Jun Wang et al., "Music Recommender System for Wi-Fi Walkman," No. ICT-2003-01 in the ICT Group Technical Report Series, 23 pages.

"Musicstrands.com Because Music is Social," copyright 2006 MusicStrands, Inc., 2 pages.

"MyStrands for Windows," http://www.mystrands.com/overview.vm, copyright 2003-2007 MediaStrands, Inc., printed Feb. 7, 2007, 3 pages.

(56) References Cited

OTHER PUBLICATIONS

"UpTo11.net—Music Recommendations and Search," http://www.upto11.net/, copyright 2005-2006 Upto11.net, printed Feb. 7, 2007, 1 page.

"LAUNCHcast Radio—Yahoo! Messenger," http://messenger.yahoo.com/launch.php, copyright 2007 Yahoo! Inc., printed Nov. 8, 2007, 1 page.

"Apple—iPod classic," http://www.apple.com/ipodclassic/, printed Oct. 26, 2007, 1 page.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

Abstract, Japanese Patent Publication No. 2005-321668, published Nov. 17, 2005, "Device and method for processing information, and program," Japanese Patent Application No. 2004-140602, filed May 11, 2004, Applicant: Sony Corp, Inventor: Kobayashi Yoshiyuki, obtained from the Patent Abstracts of Japan (PAJ), 1 page.

Gartner, D. et al., "An Adaptive Distance Measure for Similarity Based Playlist Generation," ICASSP 2007, Honolulu, Hawaii, Apr. 15-20, 2007, IEEE, vol. 1, pp. 1-229-1-232, 7 pages.

"Gracenote Playlist Plus," Product Overview, Revised Dec. 29, 2005, Copyright 2005, Gracenote, 2 pages.

"Gracenote Playlist," Product Overview, Revised Dec. 29, 2005, Copyright 2005, Gracenote, 2 pages.

Henry, Alan, "MixxMaker: The Mix Tape Goes Online," Jan. 18, 2008, found at <http://appscout.pcmag.com/crazy-start-ups-vc-time/276029-mixxmaker-the-mix-tape-goes-online#fbid=DfUZtDa46ye>, printed Nov. 15, 2011, 4 pages.

Jensen, C.A. et al., "A Data and Query Model for Dynamic Playlist Generation," 2007 IEEE 23rd International Conference on Data Engineering Workshop, Apr. 17-20, 2007, Istanbul, Turkey, Copyright 2007, IEEE, pp. 65-74, 10 pages.

"JReceiver Audio Server," copyright 2001-2002, Reed Esau & the JReceiver Project, at <http://jreceiver.sourceforge.net/>, printed Apr. 1, 2011, 7 pages.

"MusicIP—The Music Search Engine," at <http://www.musicip.com/>, copyright 2006-2007, MusicIP Corporation, printed Feb. 7, 2007, 1 page.

"MyStrands Download," at <http://www.mystrands.com/overview.vm>, copyright 2003-2007, MediaStrands, Inc., printed Feb. 7, 2007, 3 pages.

"Product Features—Qsonix Digital Music Systems," copyright 2008, Qsonix, Inc., at <http://qsonix.com/Public/Features.aspx>, printed Mar. 27, 2008, 5 pages.

Kevin C. Almeroth et al., "An Alternative Paradigm for Scalable On-Demand Applications: Evaluating and Deploying the Interactive Multimedia Jukebox," IEEE Transactions on Knowledge and Data Engineering, vol. 11, No. 4, Jul./Aug. 1999, pp. 658-672, copyright 1999 IEEE, 15 pages.

"Calling all Wizards, Witches, Ghouls and Goblins—County Library to Receive 200 Copies of 'Harry Potter and the Order of the Phoenix'," dated Jun. 3, 2003, at <http://www.co.san-diego.ca.us/cnty/bos/media/m030603harry.html>, printed Jun. 18, 2009, 2 pages.

"Cosmic Software Floating license Management," at <http://www.cosmic-software.com/flexlm_flo . . . >, from the Internet Archive, dated Oct. 28, 2007, last updated Aug. 29, 2007, copyright 2005, Cosmic Software Inc., printed Jun. 16, 2009, 2 pages.

Kosugi, Naoko et al., "A Practical Query-By-Humming System for a Large Music Database,"Proceedings of the 8th ACM International Conference on Multimedia, Oct. 30-Nov. 3, 2000, Los Angeles, California, copyright 2000, ACM, pp. 333-342.

"About uPlayMe," at <http://www.uplayme.com/about.php>, copyright 2008, uPlayMe, Inc., 4 pages.

"Amazon.com: Online Shopping for Electronics, Apparel, Computers, Books, DVDs & m . . . ," at <http://www.amazon.com/>, copyright 1996-2007, Amazon.com, Inc., printed Oct. 26, 2007, 4 pages.

Huang, Yao-Chang et al., "An Audio Recommendation System Based on Audio Signature Description Scheme in MPEG-7 Audio," IEEE International Conference on Multimedia and Expo (ICME), Jun. 27-30, 2004, IEEE, pp. 639-642.

"Babulous :: Keep it loud," at <http://www.babulous.com/home.jhtml>, copyright 2009, Babulous, Inc., printed Mar. 26, 2009, 2 pages.

"Better Propaganda—Free MP3s and music videos," at <http://www.betterpropaganda.com/>, copyright 2004-2005, betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

Mitchell, Bradley, "Cable Speed—How Fast is Cable Modem Internet?," at <http://www.compnetworking.about.com/od/internetaccessbestuses/f/cablespeed.htm>, copyright 2005, About, Inc., printed Feb. 24, 2010, 2 pages.

"The Classic TV Database—Your Home for Classic TV!—www.classic-tv.com," http://www.classic-tv.com, copyright The Classic TV Database—www.classic-tv.com, printed Feb. 7, 2007, 3 pages.

"Digital Tech Life >> Download of the Week," earliest post Sep. 30, 2005, latest post Jul. 2, 2006, at <http://www.digitaltechlife.com/category/download-of-the-week/>, printed Feb. 16, 2007, 9 pages.

"Digital Music News," at <http://www.digitalmusicnews.com/results?title=musicstrands>, copyright 2003-6 Digital Music News, earliest post Aug. 2005, latest post May 2006, printed Aug. 8, 2006, 5 pages.

"GenieLab::Music Recommendation System," at <http://genielab.com/>, from the Internet Archive on Aug. 13, 2006, copyright 2005, GenieLab, LLC, printed Oct. 30, 2007, 1 page.

GenieLab.com grants music lovers' wishes, http://barometer.orst.edu/home/index.cfm?event=displayArticlePrinterFrien- dly&uStory.sub.—id=5c420acf-a1fb-448c-8ffd-39ec5c448b6f.

"Gracenote," found at <http://www.gracenote.com>, printed Feb. 7, 2007, available on Internet Archive at least as early as Jan. 2006, 1 page.

"How many songs are in your iTunes Music library (or libraries in total, if you use more than one)?," at <http://www.macoshints.com/polls/index.php?pid=itunesmusiccount>, includes postings dated as early as Jun. 2008, printed Feb. 24, 2010, copyright 2010, Mac Publishing LLC, 10 pages.

"Zune.net—How-To-Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.

"Hulu—About," at <http://www.hulu.com/about/product_tour>, copyright 2010, Hulu LLC, appears to have been accessible as early as early 2008, printed Jun. 15, 2010, 2 pages.

Nilsson, Martin, "id3v2.4.0-frames—ID3.org," at <http://www.id3.org/id3v2.4.0-frames>, dated Nov. 1, 2000, last updated Dec. 18, 2006, copyright 1998-2009, printed Jun. 15, 2010, 31 pages.

"Identifying iPod models," at <http://support.apple.com/kb/HT1353>, page last modified Jan. 15, 2010, includes information dating back to 2001,printed Feb. 24, 2010, 13 pages.

"IEEE 802.11—Wlkipedia, the free encyclopedia," http://en.wikipedia.org/wiki/IEEE_802.11, printed Oct. 26, 2007, 5 pages.

"iLikeTM—Home," found at <http://www.ilike.com/>, copyright 2007, iLike, printed May 17, 2007, 2 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Last.fm—The Social Music Revolution," at <http://www.last.fm/>, printed Feb. 7, 2007, 1 page.

"Last.fm—Wikipedia, the free encyclopedia," at <http://en.wikipedia.org/wiki/Last.fm>, last modified on Aug. 8, 2006, printed Aug. 8, 2006, 7 pages.

"LimeWire—Wikipedia, the free encyclopedia," at <http://en.wikipedia.org/wiki/LimeWire>, last modified Aug. 6, 2006, printed Aug. 8, 2006, 2 pages.

"Listen with Last.fm and fuel the social music revolution," at <http://www.last.fm/tour/>, copyright 2002-2007, Last.fm Ltd., printed Oct. 4, 2007, 1 page.

(56) References Cited

OTHER PUBLICATIONS

"liveplasma music, movies, search engine and discovery engine," at <http://www.liveplasma.com>, printed May 17, 2007, 1 page.

"Loomia Personalized Recommendations for Media, Content and Retail Sites," at <http://www.loomia.com/>, copyright 2006-2007, Loomia Inc., printed Feb. 7, 2007, 2 pages.

"Mercora—Music Search and Internet Radio Network," at <http://www.mercora.conn/v6/_front/web.jsp>, printed Feb. 7, 2007, 1 page.

"Mercora—Music Search and Internet Radio Network," at <http://www.mercora.com/overview.asp>, copyright 2004-2006, Mercora, Inc., printed Aug. 8, 2006, 1 page.

"Mongomusic.com—The Best Download mp3 Resource and Information. This website is for sale!," http://www.mongomusic.com/, printed May 17, 2007, 2 pages.

"MP3 music download website, eMusic," at <http://www.emusic.com/>, copyright 2007, eMusic.com Inc., printed Feb. 7, 2007, 1 page.

"Music Recommendations 1.0—MacUpdate," at <http://www.macupdate.com/info.php/id/19575>, Oct. 4, 2005, printed Feb. 16, 2007, 1 page.

"MusicGremlin," at <http://www.musicgremlin.com/StaticContent.aspx?id=3>, copyright 2005, 2006, 2007, MusicGremlin, Inc., printed Oct. 26, 2007, 1 page.

Linder, Brad, "Muziic media player streams audio from YouTube—for now—Download Squad," at <http://www.downloadsquad.com/2009/03/09/muziic-media-player-streams-audio-from-you . . . >, Mar. 9, 2009, copyright 2003-2009, Weblogs, Inc., printed Jun. 14, 2010, 2 pages.

"MyStrands Social Recommendation and Discovery," at <http://www.mystrands.com/>, copyright 2003-2007 MediaStrands, Inc., printed Feb. 7, 2007, 2 pages.

"MyStrands for Windows 0.7.3 Beta," copyright 2002-2006, ShareApple.com networks, printed Jul. 16, 2007, 3 pages.

"MyStrands for Windows Change Log," at <http://www.mystrands.com/mystrands/windows/changelog.vm>, earliest log dated Feb. 2006, printed Jul. 16, 2007, 6 pages.

"Napster—All the Music You Want," at <http://www.napster.com/using_napster/all_the___music_you_want.html>, copyright 2003-2006, Napster, LLC, printed Feb. 7, 2007, 2 pages.

"Not safe for work—Wikipedia, the free encyclopedia," http://en.wikipedia.org/wiki/Work_safe, printed Nov. 8, 2007, 2 pages.

"Outlook Home Page—Microsoft Office Online," http://office.microsoft.com/en-us/outlook/default.aspx, copyright 2007 Microsoft Corporation, printed Nov. 8, 2007, 1 page.

"FAQ," at <http://blog.pandora.com/faq/>, copyright 2005-2006, Pandora Media, Inc., printed Aug. 8, 2006, 20 pages.

"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.

Sarwar, Badrul M. et al., "Recommender Systems for Large-scale E-Commerce: Scalable Neighborhood Formation Using Clustering," Proceedings of the Fifth International Conference on Computer and Information Technology, Dec. 27-28, 2002, East West University, Dhaka, Bangladesh, 6 pages.

"Review of Personalization Technologies: Collaborative Filtering vs. ChoiceStream's Attributized Bayesian Choice Modeling," Technology Brief, ChoiceStream, Feb. 4, 2004, found at <http://www.google.com/url?sa=t&rct=j&q=choicestream%20review%20of%20personalization&source=web&cd=1&ved=0CDcQFjAA&url=http%3A%2F%2Fwww.behavioraltargeting.info%2Fdownloadattachment.php%3Fald%3Dcf74d490a8b97edd535b4ccdbfd0df55%26articled%3D31&ei=C2jeTr71AurZ0QGCgsGvBw&usg=AFQjCNEBLn7jJCDh-VYty3h79uFKGFBkRW>, 13 pages.

"Ringo: Social Information Filtering for Music Recommendation," http://jolomo.net/ringo.html, printed Aug. 3, 2009, 1 page.

"RYM FAQ—Rate Your Music," at <http://rateyourmusic.com/faq/>, copyright 2000-2007, rateyourmusic.com, printed Nov. 8, 2007, 14 pages.

Cai, Rui et al., "Scalable Music Recommendation by Search," Proc. ACM Multimedia, Augsburg, Germany, Sep. 23-28, 2007, pp. 1065-1074.

"Songbird," at <http://getsongbird.com/>, copyright 2010, Songbird, printed Jun. 15, 2010, 2 pages.

"SongReference," at <http://songreference.com/>, copyright 2008, SongReference.com, printed Jun. 15, 2010, 1 page.

"Soundflavor," at <http://www.soundflavor.com/>, copyright 2003-2007, Soundflavor, Inc., printed Feb. 7, 2007, 1 page.

"Subscribe to Napster," at <http://www.napster.com/subscribe>, found on the Internet Archive, dated Aug. 6, 2006, copyright 2003-2006, Napster, LLC, printed Dec. 21, 2011, 4 pages.

"Take a look at the Future of Mobile Music—Music Guru," at <http://www.symbian-freak.com/news/006/02/music_guru.htm> Feb. 23, 2006, copyright 2005, Symbian freak, printed Feb. 7, 2007, 3 pages.

"that canadian girl >> Blog Archive >> GenieLab," posted Feb. 22, 2005, at <http://www.thatcanadiangirl.co.uk/blog/2005/02/22/genielab/>, copyright 2007, Vero Pepperrell, printed Feb. 16, 2007, 3 pages.

Barrie-Anthony, Steven, "That song sounds familiar," Los Angeles Times, Feb. 3, 2006, available from <http://www.calendarlive.com/printedition/calendar/cl-et-pandora3feb03,0,7458778.story?track=tottext,0,19432.story?track=tothtml>, printed Feb. 3, 2006, 5 pages.

Nealon, Andrew D., "The Daily Barometer—GenieLab.com grants music lovers' wishes," posted Feb. 16, 2005, at <http://media.barometer.orst.edu/home/index.cfm?event=displayArticlePrinterFriendly&uSt . . . >, copyright 2007, The Daily Barometer, printed Feb. 16, 2007, 2 pages.

"The Internet Movie Database (IMDb)," http://www.imdb.com/, copyright 1990-2007 Internet Movie Database Inc., printed Feb. 7, 2007, 3 pages "Thunderbird—Reclaim your inbox," http://www.mozilla.com/en-US/thunderbird/, copyright 2005-2007 Mozilla, printed Nov. 8, 2007, 2 pages.

"Tour's Profile," at <http://mog.com/Tour>, copyright 2006-2009, Mog Inc., printed Aug. 3, 2009, 11 pages.

"Trillian (software)—Wikipedia, the free encyclopedia," http://en.wikipedia.org/wiki/Trillian_(instant_messenger), printed Nov. 8, 2007, 11 pages.

Golbeck, Jennifer, "Trust and Nuanced Profile Similarity in Online Social Networks," Mindswap Technical Report TR-MS1284, 2006, available from <http://www.cs.umd.edu/~golbeck/publications.shtml>, 30 pages.

"Try Napster free for 7 Days—Play and download music without paying per song.," http://www.napster.com/choose/index.html, copyright 2003-2007 Napster, LLC, printed Feb. 7, 2007, 1 page.

"uPlayMe.com Meet People, Music Sharing—Home," at <http://www.uplayme.com/>, copyright 2008, uPlayMe, Inc., printed Mar. 26, 2009, 1 page.

"Webjay—Playlist Community," at <http://www.webjay.org/>, copyright 2006, Yahoo! Inc., printed Feb. 7, 2007, 5 pages.

"Welcome to the Musicmatch Guide," at <http://www.mmguide.musicmatch.com/>, copyright 2001-2004, Musicmatch, Inc., printed Feb. 7, 2007, 1 page.

"What is the size of your physical and digital music collection?," at <http://www.musicbanter.com/general-music/47403-what-size-your-physical-digital-music-collection12.html>, earliest posting shown: Sep. 21, 2008, printed Feb. 24, 2010, copyright 2010, Advameg, Inc., SEO by vBSEO 3.2.0 copyright 2008, Crawlability, Inc., 6 pages.

Dean, Katie, "Whose Song Is That, Anyway?," Wired News, Feb. 12, 2003, at <http://www.wired.com/news/digiwood/1,57634-0.html>, copyright 2005, Lycos, Inc., printed Oct. 9, 2006, 3 pages.

(56) References Cited

OTHER PUBLICATIONS

"Yahoo! Music," at <http://music.yahoo.com>, dated Jun. 20, 2005, from the Internet Archive, copyright 2005, Yahoo! Inc., printed Dec. 18, 2009, 14 pages.

"Yahoo Music Jukebox," Wikipedia, at <http://en.wikipedia.org/wiki/Yahoo_music_engine>, last modified Aug. 3, 2006, printed Aug. 8, 2006, 1 page.

"YouTube—Broadcast Yourself.," at <http://www.youtube.com/>, copyright 2007, YouTube, LLC, printed Oct. 26, 2007, 2 pages.

* cited by examiner

| ▲ | Name | Time | Artist | Album | Genre | Rating |
|---|---|---|---|---|---|---|
| 1 | ☑ Mama's Boy | 2:11 | The Ramo | Mania | Alternative & Punk | ★★★ |
| 2 | ☑ I Wanna Be Sedated | 2:30 | The Ramones | Mania | Alternative & Punk | ★★★ |
| 3 | ☑ Teenage Lobotomy | 2:02 | The Ramones | Mania | Alternative & Punk | ★★★ |
| 4 | ☑ Do You Remember Rock'n'Roll | 3:51 | The Ramones | Mania | Alternative & Punk | ★★★ |
| 5 | ☑ Gimme Gimme Shock Treatment | 1:42 | The Ramones | Mania | Alternative & Punk | ★★★ |
| 6 | ☑ Beat On the Brat | 2:31 | The Ramones | Mania | Alternative & Punk | ★★★ |
| 7 | ☑ Sheena Is A Punk Rocker | 2:46 | The Ramones | Mania | Alternative & Punk | ★★★ |
| 8 | ☑ I Wanna Live | 2:38 | The Ramones | Mania | Alternative & Punk | ★★★ |
| 9 | ☑ Pinhead | 2:44 | The Ramones | Mania | Alternative & Punk | ★★★ |
| 10 | ☑ Blitzkrieg Bop | 2:11 | The Ramones | Mania | Alternative & Punk | ★★★ |
| 11 | ☑ Cretin Hop | 1:55 | The Ramones | Mania | Alternative & Punk | ★★★ |
| 12 | ☑ Rockaway Beach | 2:05 | The Ramones | Mania | Alternative & Punk | ★★★ |
| 13 | ☑ Commando | 1:53 | The Ramones | Mania | Alternative & Punk | ★★★ |
| 14 | ☑ I Wanna Be Your Boyfriend | 2:27 | The Ramones | Mania | Alternative & Punk | ★★★ |
| 15 | ☑ Bop 'Til You Drop | 2:12 | The Ramones | Mania | Alternative & Punk | ★★★ |
| 16 | ☑ We're A Happy Family | 2:39 | The Ramones | Mania | Alternative & Punk | ★★★ |
| 17 | ☑ Bonzo Goes To Bitburg | 3:54 | The Ramones | Mania | Alternative & Punk | ★★★ |
| 18 | ☑ Outsider | 2:09 | The Ramones | Mania | Alternative & Punk | ★★★ |
| 19 | ☑ Psycho Therapy | 2:36 | The Ramones | Mania | Alternative & Punk | ★★★ |
| 20 | ☑ Wart Hog | 1:55 | The Ramones | Mania | Alternative & Punk | ★★★ |
| 21 | ☑ Animal Boy | 1:52 | The Ramones | Mania | Alternative & Punk | ★★★ |
| 22 | ☑ Needles & Pins | 2:22 | The Ramones | Mania | Alternative & Punk | ★★★ |
| 23 | ☑ Howling At The Moon (She-La... | 3:33 | The Ramones | Mania | Alternative & Punk | ★★★ |
| 24 | ☑ Somebody Put Something In M... | 3:20 | The Ramones | Mania | Alternative & Punk | ★★★ |
| 25 | ☑ We Want The Airwaves | 3:21 | The Ramones | Mania | Alternative & Punk | ★★★ |
| 26 | ☑ Chinese Rock | 2:28 | The Ramones | Mania | Alternative & Punk | ★★★ |
| 27 | ☑ I Just Wanna Have Something T... | 2:42 | The Ramones | Mania | Alternative & Punk | ★★★ |
| 28 | ☑ The KKK Took My Baby Away | 2:32 | The Ramones | Mania | Alternative & Punk | ★★★ |
| 29 | ☑ Indian Giver | 2:46 | The Ramones | Mania | Alternative & Punk | ★★★ |
| 30 | ☑ Rock'n'Roll High School | 2:19 | The Ramones | Mania | Alternative & Punk | ★★★ |
| 31 | ☑ What's Happened To You | 4:14 | The Call | Red Moon | Rock | ★★★★ |
| 32 | ☑ Red Moon | 3:46 | The Call | Red Moon | Rock | ★★★★ |
| 33 | ☑ You Were There | 4:06 | The Call | Red Moon | Rock | ★★★★ |
| 34 | ☑ Floating Back | 3:23 | The Call | Red Moon | Rock | ★★★★ |
| 35 | ☑ A Swim In The Ocean | 3:53 | The Call | Red Moon | Rock | ★★★★ |
| 36 | ☑ Like You Never Been Loved | 4:13 | The Call | Red Moon | Rock | ★★★★ |
| 37 | ☑ Family | 3:42 | The Call | Red Moon | Rock | ★★★★ |
| 38 | ☑ This Is Your Life | 4:10 | The Call | Red Moon | Rock | ★★★★ |
| 39 | ☑ The Hand That Feeds You | 3:38 | The Call | Red Moon | Rock | ★★★★ |
| 40 | ☑ What A Day | 4:13 | The Call | Red Moon | Rock | ★★★★ |

*FIG. 1*
*(PRIOR ART)*

| Since You're Gone | 3:31 | The Cars | The Cars Greatest Hits | Rock | 60 |
|---|---|---|---|---|---|
| Overjoyed | 2:58 | Jars of Clay | Much Afraid | Gospel & Religious | 60 |
| Fade To Grey | 3:35 | Jars of Clay | Much Afraid | Gospel & Religious | 60 |
| Frail | 6:58 | Jars of Clay | Much Afraid | Gospel & Religious | 60 |
| Five Candles (You Were There) | 3:49 | Jars of Clay | Much Afraid | Gospel & Religious | 60 |
| Weighted Down | 3:39 | Jars of Clay | Much Afraid | Gospel & Religious | 60 |
| Touch And Go | 4:56 | The Cars | The Cars Greatest Hits | Rock | 59 |
| Heartbeat City | 4:30 | The Cars | | Rock | 59 |
| I'm Not The One | 4:11 | The Cars | The Cars Greatest Hits | Rock | 59 |
| Magic | 3:57 | The Cars | The Cars Greatest Hits | Rock | 59 |
| Shake It Up | 3:34 | The Cars | The Cars Greatest Hits | Rock | 59 |
| You Might Think | 3:05 | The Cars | The Cars Greatest Hits | Rock | 58 |
| Drive | 3:55 | The Cars | The Cars Greatest Hits | Rock | 58 |
| Tonight She Comes | 3:54 | The Cars | The Cars Greatest Hits | Rock | 58 |
| Tea And Sympathy | 4:52 | Jars of Clay | Much Afraid | Gospel & Religious | 55 |
| Crazy Times | 3:35 | Jars of Clay | Much Afraid | Gospel & Religious | 55 |
| Good Times Roll | 3:44 | The Cars | The Cars Greatest Hits | Rock | 50 |
| My Best Friend's Girl | 3:42 | The Cars | The Cars Greatest Hits | Rock | 50 |
| Let's Go | 3:34 | The Cars | The Cars Greatest Hits | Rock | 50 |

*FIG. 3*

| | | | | | | |
|---|---|---|---|---|---|---|
| Group 1 | Since You're Gone | 3:31 | The Cars | The Cars Greatest Hits | Rock | 60 | Group Score: 59 |
| | Touch And Go | 4:56 | The Cars | The Cars Greatest Hits | Rock | 59 | |
| | Heartbeat City | 4:30 | The Cars | The Cars Greatest Hits | Rock | 59 | |
| | I'm Not The One | 4:11 | The Cars | The Cars Greatest Hits | Rock | 59 | |
| | Magic | 3:57 | The Cars | The Cars Greatest Hits | Rock | 59 | |
| | Shake It Up | 3:34 | The Cars | The Cars Greatest Hits | Rock | 59 | |
| | You Might Think | 3:05 | The Cars | The Cars Greatest Hits | Rock | 58 | |
| | Drive | 3:55 | The Cars | The Cars Greatest Hits | Rock | 58 | |
| | Tonight She Comes | 3:54 | The Cars | The Cars Greatest Hits | Rock | 58 | |
| Group 2 | Overjoyed | 2:58 | Jars of Clay | Much Afraid | Gospel & Religious | 60 | Group Score: 59 |
| | Fade To Grey | 3:35 | Jars of Clay | Much Afraid | Gospel & Religious | 60 | |
| | Frail | 6:58 | Jars of Clay | Much Afraid | Gospel & Religious | 60 | |
| | Five Candles (You Were There) | 3:49 | Jars of Clay | Much Afraid | Gospel & Religious | 60 | |
| | Weighted Down | 3:39 | Jars of Clay | Much Afraid | Gospel & Religious | 60 | |
| | Tea And Sympathy | 4:52 | Jars of Clay | Much Afraid | Gospel & Religious | 55 | |
| | Crazy Times | 3:35 | Jars of Clay | Much Afraid | Gospel & Religious | 55 | |
| Group 3 | Good Times Roll | 3:44 | The Cars | The Cars Greatest Hits | Rock | 50 | Group Score: 50 |
| | My Best Friend's Girl | 3:42 | The Cars | The Cars Greatest Hits | Rock | 50 | |
| | Let's Go | 3:34 | The Cars | The Cars Greatest Hits | Rock | 50 | |

*FIG. 4*

| Group 1: (Range: 5; Album) - Group Score: 59 | | | |
|---|---|---|---|
| Since You're Gone | 3:31 | The Cars | The Cars Greatest Hits | Rock | 60 |
| Touch And Go | 4:56 | The Cars | The Cars Greatest Hits | Rock | 59 |
| (7 more) | 28:14 | The Cars | The Cars Greatest Hits | Rock | (58) |
| Group 2: (Range: 5; Album) - Group Score: 59 | | | |
| Overjoyed | 2:58 | Jars of Clay | Much Afraid | Gospel & Religious | 60 |
| Fade To Grey | 3:35 | Jars of Clay | Much Afraid | Gospel & Religious | 60 |
| (5 more) | 22:13 | Jars of Clay | Much Afraid | Gospel & Religious | (58) |
| Group 3: (Range: 5; Album) - Group Score: 50 | | | |
| Good Times Roll | 3:44 | The Cars | The Cars Greatest Hits | Rock | 50 |
| My Best Friend's Girl | 3:42 | The Cars | The Cars Greatest Hits | Rock | 50 |
| (1 more) | 3:34 | The Cars | The Cars Greatest Hits | Rock | 50 |

*FIG. 5*

| Group 1: (Range: 10; Album) - Group Score: 57 ||||
|---|---|---|---|
| Since You're Gone | 3:31 | The Cars | The Cars Greatest Hits | Rock | 60 |
| Touch And Go | 4:56 | The Cars | The Cars Greatest Hits | Rock | 59 |
| (10 more) | 39:34 | The Cars | The Cars Greatest Hits | Rock | (57) |
| Group 2: (Range: 10; Album) - Group Score: 59 ||||
| Overjoyed | 2:58 | Jars of Clay | Much Afraid | Gospel & Religious | 60 |
| Fade To Grey | 3:35 | Jars of Clay | Much Afraid | Gospel & Religious | 60 |
| (5 more) | 22:13 | Jars of Clay | Much Afraid | Gospel & Religious | (58) |

| | Group 1: (Range: 5; Album) - Group Score: 59 | | | |
|---|---|---|---|---|
| Since You're Gone | 3:31 | The Cars | The Cars Greatest Hits | Rock | 60 |
| Touch And Go | 4:56 | The Cars | The Cars Greatest Hits | Rock | 59 |
| (7 more) | 28:14 | The Cars | The Cars Greatest Hits | Rock | (58) |
| | Group 2: (Range: 5; Album) - Group Score: 59 | | | |
| Overjoyed | 2:58 | Jars of Clay | Much Afraid | Gospel & Religious | 60 |
| Fade To Grey | 3:35 | Jars of Clay | Much Afraid | Gospel & Religious | 60 |
| (5 more) | 22:13 | Jars of Clay | Much Afraid | Gospel & Religious | (58) |
| | Group 3: (Range: 5; Album) - Group Score: 50 | | | |
| Good Times Roll | 3:44 | The Cars | The Cars Greatest Hits | Rock | 50 |
| My Best Friend's Girl | 3:42 | The Cars | The Cars Greatest Hits | Rock | 50 |
| (1 more) | 3:34 | The Cars | The Cars Greatest Hits | Rock | 50 |

*FIG. 9*

| Group 1: (Range: 5; Album) - Group Score: 59 |||||
|---|---|---|---|---|
| Since You're Gone | 3:31 | The Cars | The Cars Greatest Hits | Rock | 60 |
| Touch And Go | 4:56 | The Cars | The Cars Greatest Hits | Rock | 59 |
| Heartbeat City | 4:30 | The Cars | The Cars Greatest Hits | Rock | 59 |
| (6 more) | 23:44 | The Cars | The Cars Greatest Hits | Rock | (58) |
| Group 2: (Range: 5; Album) - Group Score: 59 |||||
| Overjoyed | 2:58 | Jars of Clay | Much Afraid | Gospel & Religious | 60 |
| Fade To Grey | 3:35 | Jars of Clay | Much Afraid | Gospel & Religious | 60 |
| (5 more) | 22:13 | Jars of Clay | Much Afraid | Gospel & Religious | (58) |
| Group 3: (Range: 5; Album) - Group Score: 50 |||||
| Good Times Roll | 3:44 | The Cars | The Cars Greatest Hits | Rock | 50 |
| My Best Friend's Girl | 3:42 | The Cars | The Cars Greatest Hits | Rock | 50 |
| (1 more) | 3:34 | The Cars | The Cars Greatest Hits | Rock | 50 |

*FIG. 10*

| Group 1: (Range: 5; Album) - Group Score: 59 ||||
|---|---|---|---|
| Since You're Gone | 3:31 | The Cars | The Cars Greatest Hits | Rock | 60 |
| Touch And Go | 4:56 | The Cars | The Cars Greatest Hits | Rock | 59 |
| Heartbeat City | 4:30 | The Cars | The Cars Greatest Hits | Rock | 59 |
| I'm Not The One | 4:11 | The Cars | The Cars Greatest Hits | Rock | 59 |
| Magic | 3:57 | The Cars | The Cars Greatest Hits | Rock | 59 |
| Shake It Up | 3:34 | The Cars | The Cars Greatest Hits | Rock | 59 |
| You Might Think | 3:05 | The Cars | The Cars Greatest Hits | Rock | 58 |
| Drive | 3:55 | The Cars | The Cars Greatest Hits | Rock | 58 |
| Tonight She Comes | 3:54 | The Cars | The Cars Greatest Hits | Rock | 58 |
| (0 more) | | | | | |
| Group 2: (Range: 5; Album) - Group Score: 59 ||||
| Overjoyed | 2:58 | Jars of Clay | Much Afraid | Gospel & Religious | 60 |
| Fade To Grey | 3:35 | Jars of Clay | Much Afraid | Gospel & Religious | 60 |
| (5 more) | 22:13 | Jars of Clay | Much Afraid | Gospel & Religious | (58) |
| Group 3: (Range: 5; Album) - Group Score: 50 ||||
| Good Times Roll | 3:44 | The Cars | The Cars Greatest Hits | Rock | 50 |
| My Best Friend's Girl | 3:42 | The Cars | The Cars Greatest Hits | Rock | 50 |
| (1 more) | 3:34 | The Cars | The Cars Greatest Hits | Rock | 50 |

*FIG. 11* ively, playback may proceed to the next media item group in the active playlist or playback of the media items in the media item group may be repeated. In one embodiment, if the user desires to skip to the next media item group in the playlist, the user must only skip through the media items in the active playlist for the media item group rather than all of the media items for the media item group in the underlying pool of media items. As such, the user may quickly and easily skip from one group of media items to another.

ACTIVE PLAYLIST HAVING DYNAMIC MEDIA ITEM GROUPS

FIELD OF THE INVENTION

The present invention relates to playlists and more particularly relates to creation and management of an active playlist having dynamic media item groups.

BACKGROUND OF THE INVENTION

A playlist generally consists primarily of a list of media item identifiers, or references to the media items, defining a playback sequence for those media items. As an example, FIG. 1 illustrates an exemplary music playlist 10. For each song in the music playlist 10, the music playlist 10 includes a name or title of the song, a playback time or duration of the song, a name of an artist of the song, a name of an album on which the song was released, a genre of the song, and a rating of the song by one or more users. In this example, the songs in the music playlist 10 are sorted based on artist, album, or genre such that a number of songs by the artist "The Ramones" are listed at the beginning of the music playlist 10, and a number of songs by the artist "The Call" are listed at the end of the music playlist 10. One issue with the music playlist 10 is that if the user is not in the mood to listen to "The Ramones" but would rather listen to songs by "The Call," the user must manually skip through a large number of songs in the music playlist 10. This is especially burdensome on a portable media player, such as an Apple® iPod. As such, there is a need for a method and associated systems for providing an improved playlist.

SUMMARY OF THE INVENTION

The present invention relates to creation and management of an active playlist having dynamic media item groups. In general, a number of media items to be used for the active playlist are first identified and classified into one or more media item groups based on a primary criterion and, optionally, one or more secondary criteria to provide an underlying pool of media items for the active playlist. The active playlist is then populated with media items from the underlying pool of media items. More specifically, the active playlist is divided into media item groups corresponding to those in the underlying pool of media items. Each media item group in the active playlist is populated with up to a predefined number of the media items in the corresponding media item group in the underlying pool of media items. Thereafter, the media items in the media item groups of the active playlist are dynamically updated based on user interactions.

In one embodiment, the underlying pool of media items is an underlying playlist of media items that is dynamically controlled to effectively provide the active playlist. More specifically, the media items in the underlying playlist of media items are arranged according to the media item groups. In order to provide the active playlist, for each of the media item groups, the underlying playlist is controlled such that a predefined number of the media items in the media item group are provided as the corresponding media item group of the active playlist while the remaining media items from the media item group are hidden. Thereafter, the media items provided as part of the active playlist for each of the media item groups are dynamically updated based on user interactions.

In operation, a user begins playback of the active playlist. As the user consumes the media items from one of the media item groups in the active playlist, other media items in the corresponding media item group in the underlying pool of media items are rotated into the media item group in the active playlist. If the user consumes all of the media items from the underlying pool of media items in a media item group, new media items may be identified and obtained for the media item group from a local or remote source. Alternat Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 illustrates a conventional playlist according to the prior art;

Figure 2:
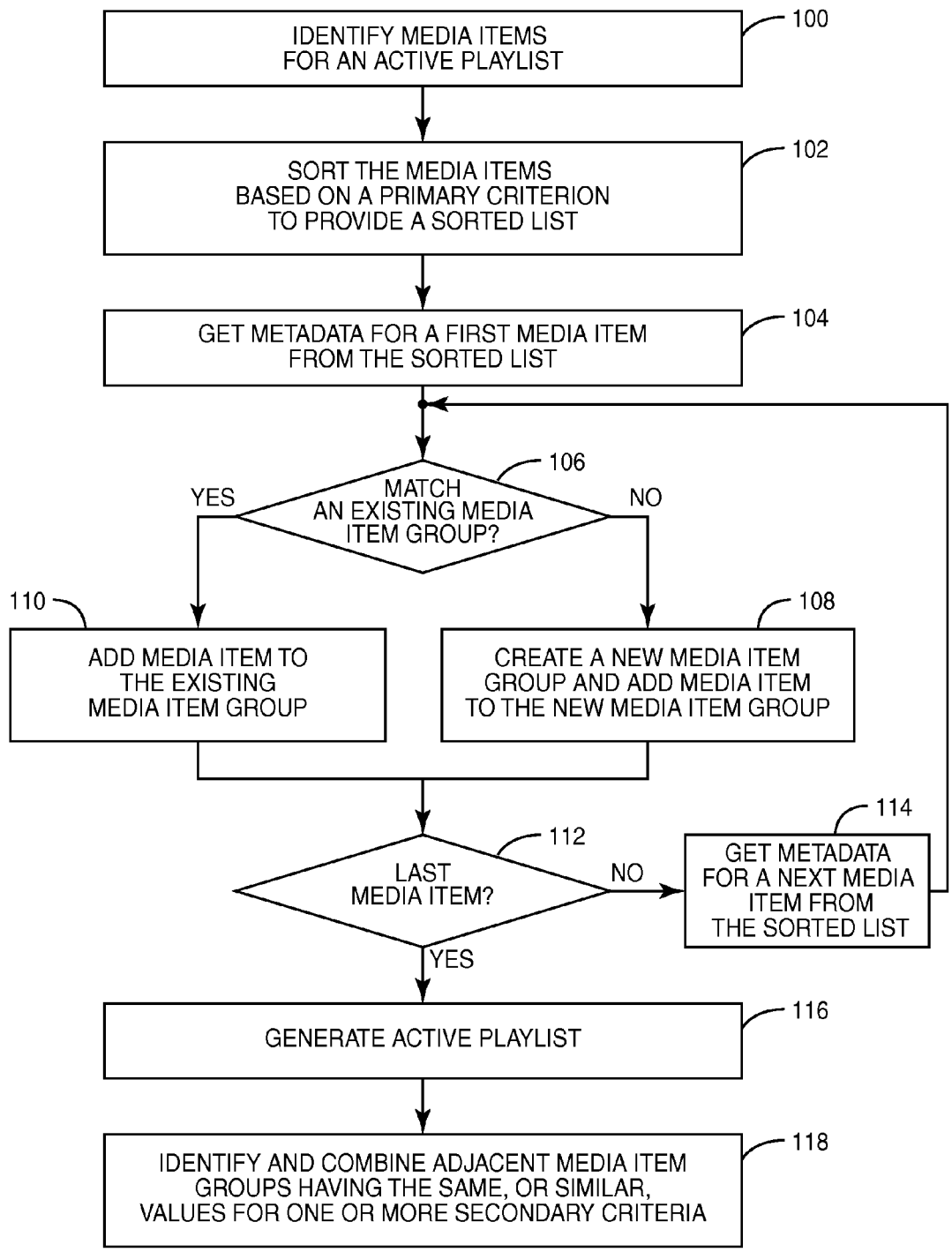
FIG. 2 is a flow chart illustrating a process for creating an active playlist having one or more dynamic media item groups according to one embodiment of the present invention.
Figure 7:
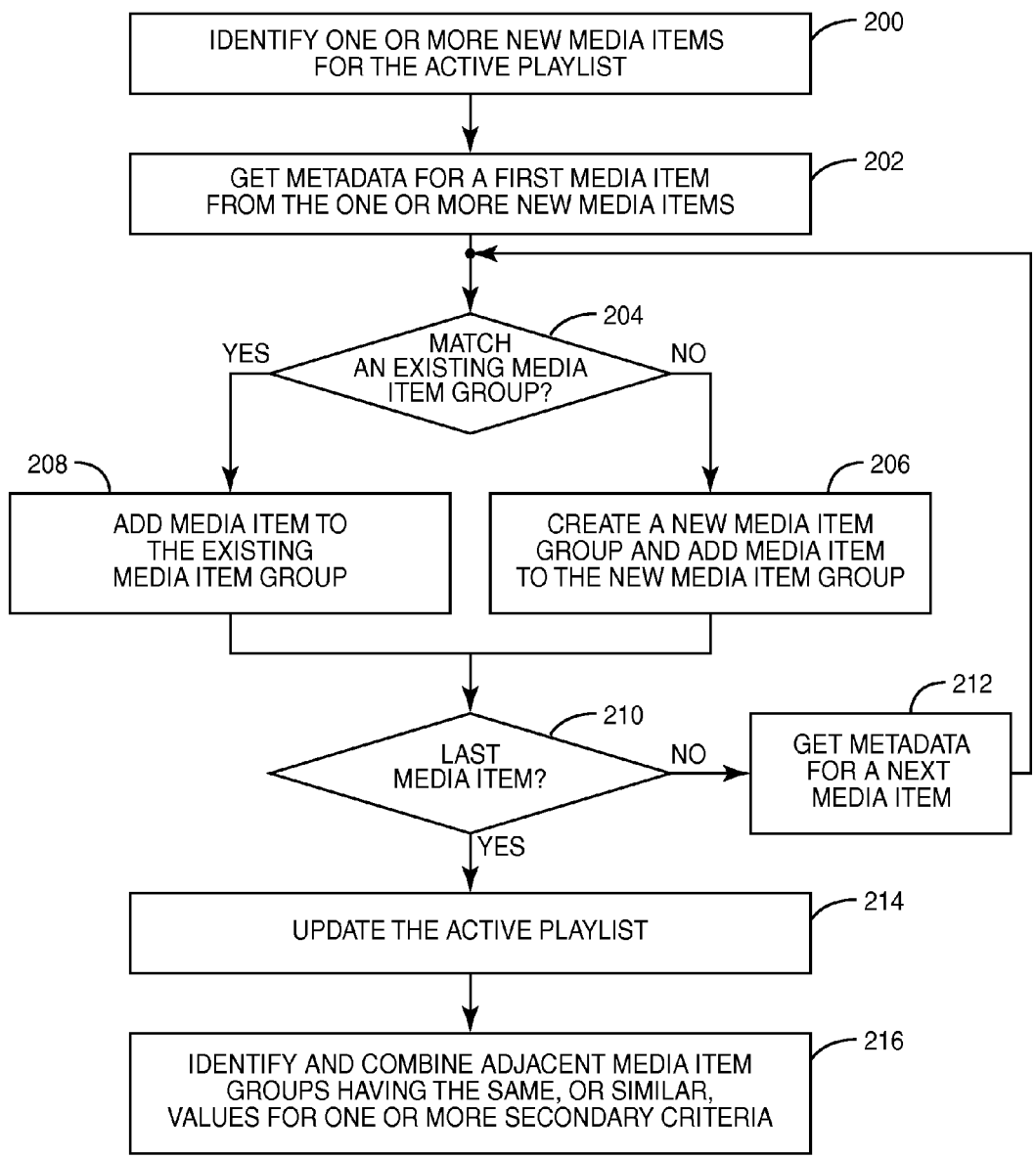
Figure 8:
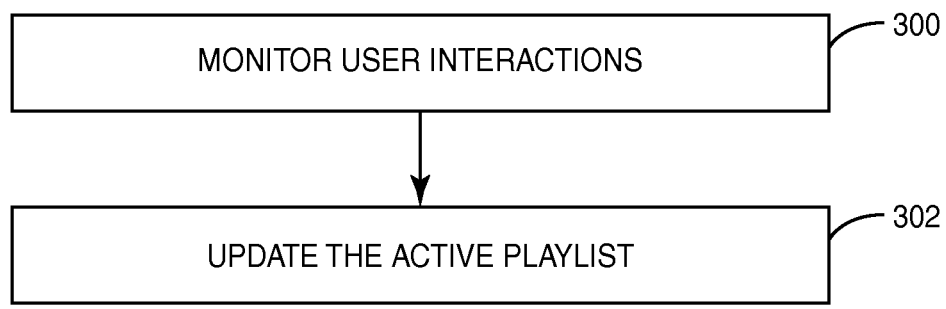
Figure 12:
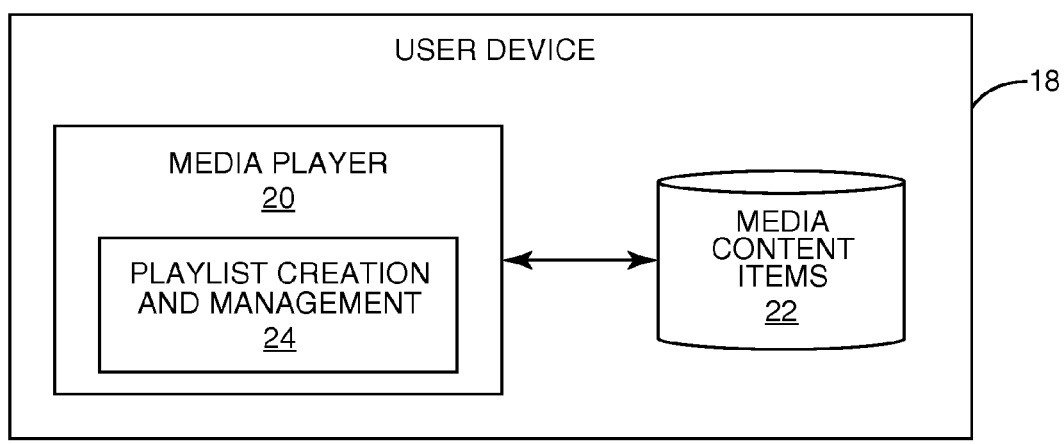
Figure 13:
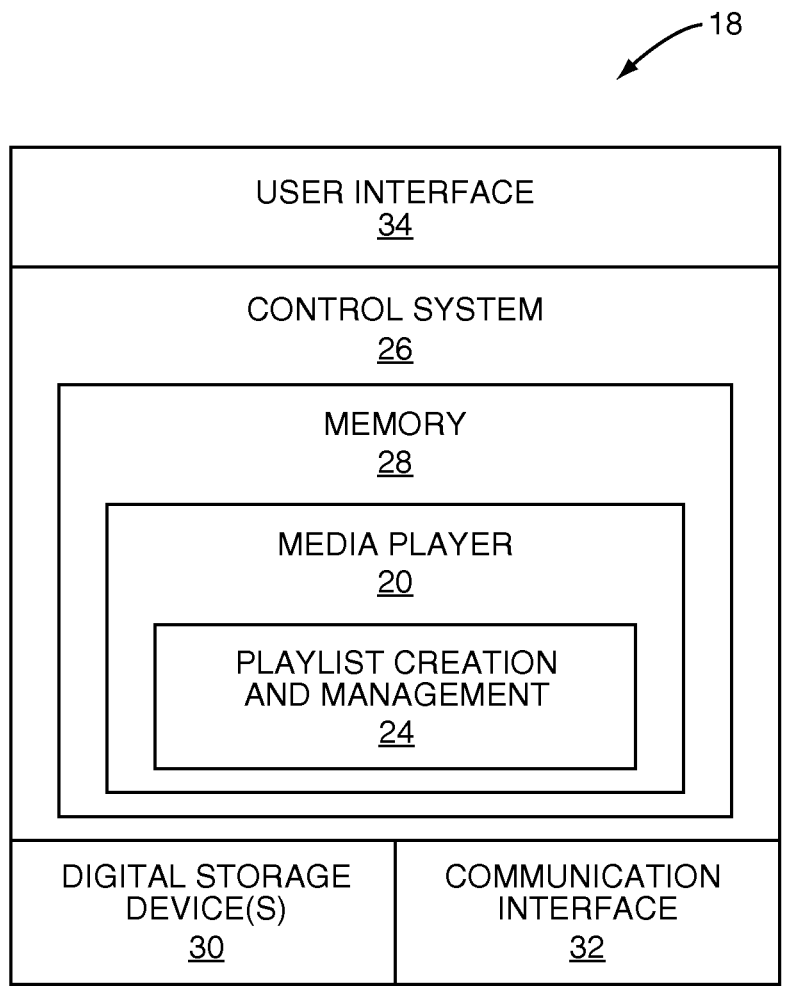

FIGS. 3 through 6 graphically illustrate the process of FIG. 2 according to one embodiment of the present invention;

FIG. 7 is a flow chart illustrating a process for adding new media items to the underlying pool of media items for the active playlist and, in response, updating the active playlist according to one embodiment of the present invention;

FIG. 8 is a flow chart illustrating a process for dynamically updating the active playlist based on user interactions according to one embodiment of the present invention;

FIGS. 9 through 11 illustrate dynamic updating of an exemplary active playlist based on user interactions according to one embodiment of the present invention;

FIG. 12 illustrates an exemplary system incorporating a playlist creation management function for creating and maintaining one or more active playlists having one or more dynamic media item groups according to one embodiment of the present invention; and FIG. 13 is a block diagram of an exemplary embodiment of the system of FIG. 12.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to creation and management of an active playlist having dynamic media item groups. While much of the discussion below focuses on an active music playlist, the present invention is not limited thereto. The present invention is equally applicable to music playlists, video playlists, or the like. FIG. 2 illustrates a flow chart for a process for creating an active playlist having dynamic media item groups according to one embodiment of the present invention. First, media items to be used for an active playlist are identified (step 100). The media items to be used for the active playlist may be, for example, a media collection of a user, a subset of a media collection of a user, media items available to a user from, for example, a streaming media server, media items available to the user for download from a media server, media items identified by one or more conventional playlists, media items obtained from or identified by other users such as media items recommended to the user from one or more other users, or the like.

The media items to be used for the active playlist may be identified by the user or may be identified programmatically. For example, the user may select a subset of media items from his or her media collection to be used for the active playlist. As another example, the media items may be programmatically identified by searching a user device of the user for all media items or media items satisfying one or more criteria. Alternatively, the media items to be used for the active playlist may be identified in some other fashion. For instance, in one embodiment, the media items for the active playlist may include media items recommended to the user and, optionally, media items from the user's own media collection. As an example, the media items for the active playlist may include media items from the user's own media collection and media items identified by recommendations received by the user in the manner described in U.S. patent application Ser. No. 11/484,130, entitled P2P NETWORK FOR PROVIDING REAL TIME MEDIA RECOMMENDATIONS, which was filed on Jul. 11, 2006 and is hereby incorporated herein by reference in its entirety.

Once the media items for the active playlist are identified, the media items may optionally be sorted based on a primary criterion to provide a sorted list of media items (step 102). Next, metadata for a first media item from the sorted list of media items, or alternatively the group of media items identified for the active playlist, is obtained (step 104). The metadata generally includes information describing the media item. For example, if the media item is a song, the metadata may include a title of the song, a name of an artist of the song, an album on which the song was released, a genre of the song, a date of release of the song, a rating of the song, a score assigned to the song based on user preferences of the user, a date or time stamp indicating a date and/or time at which the song was last played, or the like.

Next, based on the metadata, a determination is made as to whether the media item matches an existing media item group (step 106). More specifically, one or more rules for creating media item groups are provided. The one or more rules may be embedded rules, user-defined rules, systematically determined rules, or the like. The rules for creating media item groups are defined based on the primary criterion and, optionally, one or more secondary criterion such as, for example, genre, artist, album, year of release, decade of release, or the like. The primary criterion may be, for example, a score assigned to each of the media items for the active playlist based on user preferences of the user, a rating assigned to each of the media items for the active playlist by the user, a rating assigned to each of the media items for the active playlist by another user or a group of users, a time and/or date at which the media item was last played by the user, or the like. Note, however, that the primary criterion is not limited thereto.

In one embodiment, the primary criterion is a score assigned to each of the media items for the active playlist based on user preferences of the user. Further, as an example, the rules for creating the media item groups may be that the media items in a media item group have scores within a score differential, or range, of five (5) points and that the media items in a media item group must be from the same genre. Thus, for example, if the desired score differential is five (5) points, the media item groups may be created for media items having a score differential of five (5) points and being from the same genre. Using this example, the determination is made as to whether the media item matches an existing media item group by determining whether the score assigned to the media item is within five (5) points of a highest scored media item in an existing media item group and is from the same genre as other media items in that existing media item group.

If the media item does not match an existing media item group or if no media item groups have been created (as would be the case if the media item is the first media item processed), then a new media item group is created and the media item is added to the new media item group (step 108). If the media item does match an existing media item group, then the media item is added to the existing media item group (step 110).

At this point, whether the media item was added to a new media item group or an existing media item group, a determination is made as to whether the media item is the last item in the sorted list, or alternatively the last media item in the media items identified for the active playlist (step 112). If not, metadata for a next media item is obtained (step 114). The process then returns to step 106 and is repeated. Once the last media item is processed, the resulting media item groups form what is referred to herein as an underlying pool of media items for the active playlist. The underlying pool of media items may be stored in any desired type and number of data structures. However, in one embodiment, the underlying pool of media items is stored as an underlying playlist including the media item groups or, alternatively, a number of underlying playlists where each underlying playlist corresponding to one of the media item groups.

The active playlist is then generated using the underlying pool of media items (step 116). More specifically, the active playlist is divided into media item groups corresponding to the media item groups in the underlying pool of media items. Each media item group in the active playlist is populated with up to a predetermined number of media items from the corresponding media item group in the underlying pool of media items. As an example, each media item group in the active playlist may be populated with two (2) media items from the corresponding media item group in the underlying pool of media items. Note that if a particular media item group in the underlying pool of media items includes only one media item, then the corresponding media item group in the active playlist will be populated using that one media item. As a final step, adjacent media item groups in the active playlist having the same, or substantially similar, values for one or more secondary criteria may optionally be identified and combined (step 118).

Note that while the discussion above discusses the underlying pool of media items separately from the active playlist, the underlying pool of media items and the active playlist may be implemented as a single dynamic playlist or similar data structure. For example, the underlying pool of media items may be implemented as an underlying playlist arranged or divided into the media item groups. The underlying playlist may then be dynamically controlled to effectively provide the active playlist. More specifically, for each media item group, the underlying playlist may be controlled such that up to the predefined number of media items are presented to the user for playback while the remaining media items in the media item groups are hidden. The underlying playlist is thereafter controlled based on user interactions to dynamically update the media item groups for the active playlist in the manner described below.

FIGS. 3 through 6 graphically illustrate the process of FIG. 2 according to one embodiment of the present invention. FIG. 3 illustrates an exemplary list 12 of media items, which in this example are songs, to be used to dynamically populate an active playlist according to one embodiment of the present invention. In this example, the list 12 is sorted based on the primary criteria, which in this example is score.

FIG. 4 illustrates an underlying pool of media items 14 generated by classifying the media items in the list 12 (FIG. 3) into media item groups according to one embodiment of the present invention. In this example, the media item groups were created based on a score differential of five (5) points and using genre as a secondary criterion. As such, a first media item group (Group 1) includes nine (9) songs from the Rock genre having scores in the range of 55-60, which is a score differential of five (5) points relative to the score of the highest scored media item in the first media item group (Group 1). A second media item group (Group 2) includes seven (7) songs from the Gospel & Religious genre having scores in the range of 55-60, which is a score differential of five (5) points relative to the score of the highest scored media item in the second media item group (Group 2). A third media item group (Group 3) includes three (3) songs from the Rock genre having scores in the range of 45-50, which is a score differential of five (5) points relative to the score of the highest scored media item in the third media item group (Group 3). Group scores for each of the media item groups may be provided by, for example, averaging the scores of the media items in the media item groups. As an example, the group scores may be used to sort the media item groups in the active playlist.

FIG. 5 illustrates an exemplary active playlist 16 populated using the underlying pool of media items 14 of FIG. 4 according to one embodiment of the present invention. As illustrated, the active playlist 16 is arranged or divided into media item groups corresponding to those in the underlying pool of media items 14. For each media item group, the active playlist 16 is populated with a predetermined number of media items from the underlying pool of media items 14. In this example, each media item group of the active playlist 16 is populated with two (2) media items from the corresponding media item group of the underlying pool of media items 14. As such, for the first media item group (Group 1), the active playlist 16 is populated with the two highest scored media items in the first media item group (Group 1) from the underlying pool of media items 14. The second and third media item groups (Group 2 and Group 3) of the active playlist 16 are populated in a similar fashion. Also, in this example, for each of the media item groups (Group 1 through Group 3), the active playlist 16 includes information indicating the number of media items for that media item group remaining in the underlying pool of media items 14 and information related thereto such as, for example, total playback time, average score, artist name, and album name.

FIG. 6 illustrates an active playlist 16' where the media item groups in the underlying pool of media items 14 are defined by a score differential, or range, of ten (10) rather than five (5). As a result, the first media item group (Group 1) includes media items from the Rock genre having scores in the range of 50-60, and the second media item group (Group 2) includes media items from the Gospel & Religious genre having scores in the range of 50-60. For the first media item group (Group 1), the active playlist 16' is populated with the two highest scored media items in the first media item group (Group 1) from the underlying pool of media items 14. Likewise, for the second media item group (Group 2), the active playlist 16' is populated with the two highest scored media items in the second media item group (Group 2) from the underlying pool of media items 14. Note that, in one embodiment, the rules defining the media item groups are user configurable and may be changed at any time. When such a change is made, the underlying pool of media items 14 and the active playlist 16' are updated accordingly.

FIG. 7 is a flow chart illustrating an exemplary process for adding new media items to be used in populating the active playlist according to one embodiment of the present invention. First, one or more new media items to be used for the active playlist are identified (step 200). The new media items may be media items identified by the user, new media items programmatically identified, or the like. For example, if the media items to be used for the active playlist include all media items in a user's media collection, the new media items may be programmatically identified when the user adds the new media items to his or her media collection. As another example, if the media items to be used for the active playlist are a subset of the user's media collection, the new media items may be identified by the user.

Once the new media items for the active playlist are identified, metadata for a first media item from the one or more new media items is obtained (step 202). Next, based on the metadata, a determination is made as to whether the media item matches an existing media item group (step 204). If the media item does not match an existing media item group, then a new media item group is created in the underlying pool of media items for the active playlist, and the media item is added to the new media item group (step 206). If the media item does match an existing media item group, then the media item is added to the existing media item group in the underlying pool of media items for the active playlist (step 208).

At this point, whether the media item was added to a new media item group or an existing media item group, a determination is made as to whether the media item is the last new media item (step 210). If not, metadata for a next media item is obtained (step 212). The process then returns to step 204 and is repeated. Once the last new media item is processed, the active playlist is updated based on the underlying pool of media items (step 214). More specifically, if any new media item groups have been created, the active playlist is updated to include the new media item groups, and the new media item groups are populated from the underlying pool of media items in the manner described above. In addition, any new media items added to the existing media item groups are reflected in the active playlist. As a final step, adjacent media item groups in the active playlist having the same, or substantially similar, values for one or more secondary criteria may optionally be identified and combined (step 216).

Thus far, the discussion has focused on the creation of an active playlist and the updating of the active playlist in response to the addition of new media items for use in the active playlist. FIG. 8 is a flow chart illustrating a process for dynamically updating the active playlist based on user interactions according to one embodiment of the present invention. First, user interactions are monitored (step 300). The user interactions may be, for example, consuming a media item in the active playlist, consuming a threshold amount of a media item in the active playlist, skipping over a media item in the active playlist, or the like. Next, the active playlist is updated based on the user interactions (step 302).

The manner in which the active playlist is updated depends on the particular user interaction. A first type of user interaction is consuming a media item, or a threshold amount of a media item, in the active playlist. As used herein, consuming a media item refers to listening to the media item if the media item is a song or similar audio content, viewing the media item if the media item is a video or similar visual or audio-visual content, or the like. When a user has consumed a media item, or a threshold amount of a media item, in the active playlist, the active playlist is updated by adding or pulling an additional media item from the corresponding media item group from the underlying pool of media items into the active playlist. Once a media item is consumed, that media item may or may not be removed from the active playlist. Once the user has consumed all of the media items in a media item group in the underlying pool of media items, playback may proceed to the next media item group in the active playlist. Alternatively, the media items for the media item group may be repeated. Note that if pulling an additional media item for the media item group from the underlying pool of media items into the active playlist is triggered by consumption of a defined amount of a media item, that amount may be system-defined or user-defined. For example, a trigger may be provided such that pulling an additional media item into the active playlist occurs after the user has consumed 30 seconds of a media item in a particular media item group.

In addition, if the user interactions indicate that the user is expected to consume all of the media items in the underlying pool of media items for a media item group, new media items for the media item group may be identified and obtained from a local source and/or a remote source. The rules for determining when to trigger identifying and obtaining new media items for the media item groups may be system-defined or user-defined. For example, an amount of time may be defined such that if the user consumes media items in a media item group for the defined amount of time, then identifying and obtaining new media items for that media item group is triggered. As another example, an amount of time may be defined such that if the total playback time for the remaining media items of a media item group in the underlying pool of media items is equal to or less than the defined amount of time, then identifying and obtaining new media items for the media item group may be triggered.

The manner in which new media items for a media item group are identified and obtained may vary depending on the source(s) from which the new media items are to be obtained. For example, if the media items used for the active playlist are only a subset of the user's media collection, the user's media collection may be searched for additional media items matching the media item group. In addition or alternatively, new media items may be obtained from a remote source. As an example, a query for media items matching the desired media item group may be provided to a remote media distribution service such as, for example, the Apple® itunes media store, RealNetwork's Rhapsody® media distribution service, the YouTube video sharing website, or the like. In response, the media distribution service may then identify media items satisfying the query and enable download and, if necessary, purchase of one or more media items matching the desired media item group. Note that other types of remote sources of media content may additionally or alternatively be queried. For example, a Peer-to-Peer (P2P) network enabling sharing of media content may be queried. Also note that the sources used to find new media items may be system-defined or user-defined.

A second type of user interaction is skipping over one or more media items in the active playlist. If the user skips over the media items in a media item group of the active playlist, playback proceeds to the next media item group. The user is not required to skip through all of the media items in the underlying pool of media items before proceeding to the next media item group in the active playlist. Thus, for example, if two (2) media items are included in the active playlist for a media item group, the user must only skip through those two media items before proceeding to the next media item group in the active playlist. Note, however, that if the user consumes a media item in the active playlist for a threshold amount of time triggering pulling of a new media item into the corresponding media item group of the active playlist, the user may also be required to also skip over this new media item in order to skip to the next media item group in the active playlist.

A third type of user interaction is a user interaction relative to one of the media item groups, or all of the media item groups, in the active playlist. For example, the user may choose to re-sort the media items in a media item group based on a criterion such as title, artist name, album name, user rating, score, or the like. As such, the media items in the underlying pool of media items for the media item group are sorted as requested by the user. The media item group in the active playlist is then updated based on the sorted media items in the corresponding media item group of the underlying pool of media items. In a similar fashion, the user may request that the media items within all of the media item groups in the active playlist be sorted in a particular manner (e.g., title, artist name, album name, user rating, score, or the like), in which case the media items for all of the media item groups in the underlying pool of media items are sorted. The active playlist is then updated accordingly.

FIGS. 9 through 11 illustrate the exemplary active playlist 16 of FIG. 5 as the active playlist 16 is updated in response to user interactions according to one embodiment of the present invention. FIG. 9 illustrates the active playlist 16 in an initial state at some point in time after creation of the active playlist 16. If the user then listens to the first song, "Since You're Gone," in the first media item group (Group 1), or a pre-defined amount thereof, another media item for the first media item group (Group 1) is pulled from the underlying pool of media items 14 (FIG. 4) into the first media item group (Group 1) of the active playlist 16, as illustrated in FIG. 10. In this example, the media item pulled into the first media item group (Group 1) of the active playlist 16 is the song "Heartbeat City." Note that, in this example, the song "Since You're Gone" remains in the active playlist 16 after being consumed, or listened to, by the user. However, after consumption by the user, the song "Since You're Gone" may alternatively be removed from the active playlist 16. This may be beneficial where it is desirable for the user to be enabled to quickly skip to a previous media item group in the active playlist 16 in a manner similar to that in which the user is enabled to quickly skip to a next media item group in the active playlist 16.

FIG. 11 illustrates the scenario where the user has consumed or is about to consume all of the media items in the first media item group (Group 1) from the underlying pool of media items 14 (FIG. 4). More specifically, in this example, the active playlist 16 provides an indication to the user that no more media items are available for the first media item group (Group 1) beyond those that are already in the active playlist 16. In this case, after playback of the last media item in the first media item group (Group 1), which in this example is the song "Tonight She Comes," playback may proceed to the second media item group (Group 2). Alternatively, new media items may be identified and obtained from a local or remote source, as described above. As another alternative, playback of the media items for the first media item group (Group 1) may be repeated. Note that whether playback proceeds to the next media item group, new media items are identified and obtained, or playback of the media items in current media item group are repeated may be a user preference configured by the user.

FIG. 12 illustrates an exemplary system for providing an active playlist having dynamically updated media item groups according to one embodiment of the present invention. In general, the system is a user device 18 such as, for example, a personal computer, a portable media player such as an Apple® iPod, or any other user device having media playback capabilities. The user device 18 includes a media player 20 and a local collection of media items 22. The media player 20 may be implemented in software, hardware, or a combination of software and hardware. In operation, the media player 20 operates to provide playback of the local collection of media items 22. Note that the media player 20 may additionally or alternatively provide playback of streaming media content from a streaming media server. In this embodiment, a playlist creation and management function 24 is implemented within the media player 20 and operates to create and manage one or more active playlists having dynamic media item groups according to the present invention. More specifically, as discussed above, the media items in the local collection of media items 22, or some subset thereof, are identified as media items for an active playlist. The media items are classified into one or more media item groups to provide an underlying pool of media items for the active playlist. The active playlist is arranged or divided into media item groups corresponding to those in the underlying pool of media items. The media item groups of the active playlist are then populated from the media items in the corresponding media item groups in the underlying pool of media items. Thereafter, the media item groups in the active playlist are dynamically updated, as described above.

FIG. 13 is a block diagram of the user device 18 of FIG. 12 according to one embodiment of the present invention. In general, the user device 18 includes a control system 26 having associated memory 28. In this embodiment, the media player 20 including the playlist creation and management function 24 is implemented in software and stored in the memory 28. The user device 18 may also include one or more digital storage devices 30 such as one or more hard disk drives, one or more removable memory devices, or the like. In one embodiment, the local collection of media items 22 is stored in the one or more digital storage devices 30. Alternatively, all or a portion of the local collection of media items 22 may be stored in the memory 28. The user device 18 also preferably includes one or more communication interfaces 32. The one or more communication interfaces 32 may include, for example, a Bluetooth local wireless interface, a Universal Serial Bus (USB) interface, a FireWire interface, or the like, which may be beneficial for connecting the user device 18 to an associated local system. For example, if the user device 18 is a portable media player, such a communication interface may be used to connect the user device 18 to a personal computer or the like in order to, for instance, obtain new media content. The one or more communication interfaces 32 may also include, for example, an IEEE 802.11x wireless interface, a wireless telecommunications interface, or the like, which may be used to connect to remote devices or systems via a network. This type of communication interface may be beneficial where it is desirable for the user device 18 to obtain new media items from a remote system such as, for example, a remote system hosting a media distribution service. Lastly, the user device 18 includes a user interface 34, which includes components such as one or more user input devices, a display, one or more speakers, or the like.

Note that while FIGS. 12 and 13 discuss the present invention as being implemented on a user device, the present invention is not limited thereto. The playlist creation and management function 24 for creating and managing one or more active playlists having one or more dynamic media item groups may be implemented on any type of system where playlists are desirable. For example, the playlist creation and management function 24 may alternatively be implemented on a central server providing streaming playback of media items in a playlist to a user at a remote user device. Numerous other types of systems in which the playlist creation and management function 24 may be implemented will be apparent to one of ordinary skill in the art upon reading this disclosure and are to be considered within the scope of the present invention.

Those skilled in the art will recognize improvements and modifications to the preferred embodiments of the present invention. All such improvements and modifications are considered within the scope of the concepts disclosed herein and the claims that follow.

What is claimed is:

1. A method comprising:
classifying, by a user device, a plurality of media items into a plurality of media item groups based on a primary criterion;
identifying an active playlist including, for each media item group, a corresponding subset of media items of that group, leaving remaining media items for that group in an underlying pool of media items for that group; and
enabling, by the user device, playback of the active playlist such that:
as a media item from the corresponding subset of media items for the first media item group is played sequentially, the corresponding subset of media items for the first media item group is updated with a media item pulled from the underlying pool of media items for the first media item group, and
when a skip command is received, the corresponding subset of media items for the first media item group is not updated with a media item pulled from the underlying pool of media items for the first media item group and skipping through the corresponding subset of media items for the first media item group automatically moves playback to a corresponding subset of media items for a second media item group without having to skip through each media item of the underlying pool of media items for the first media item group.

2. The method of claim 1 wherein the primary criterion comprises a criterion selected from a group consisting of: a score assigned to each of the plurality of media items based on user preferences, a rating assigned to each of the plurality of media items, a time at which each of the plurality of media items was last played by the associated user, a date on which each of the plurality of media items was lasted played, and a date and time on which each of the plurality of media items was last played.

3. The method of claim 1 wherein classifying a plurality of media items comprises classifying the plurality of media items into the plurality of media item groups based on the primary criterion and one or more secondary criterion.

4. The method of claim 1 further comprising:
monitoring, by the user device, user interactions with the active playlist; and
dynamically, by the user device, updating the active playlist based on the user interactions.

5. The method of claim 4 wherein dynamically updating the active playlist comprises pulling additional media items from a media item group of the plurality of media item groups in the underlying pool of media items into the active playlist as the associated user consumes media items in the active playlist from the media item group.

6. The method of claim 1 wherein the corresponding subset of media items for the first media item group is updated with a media item pulled from the underlying pool of media items for the first media item group when a predetermined amount of a media item in the active playlist from the first media item group is played.

7. The method of claim 4 wherein dynamically updating the active playlist further comprises removing consumed media items from the active playlist.

8. The method of claim 4 further comprising:
making, by the user device, a determination, based on the user interactions, as to whether the associated user is expected to consume all media items in a media item group of the plurality of media item groups in the underlying pool of media items; and
identifying and obtaining, by the user device, one or more new media items for the media item group in the underlying pool of media items if the determination is made that the associated user is expected to consume all media items in the media item group in the underlying pool of media items.

9. The method of claim 8 wherein identifying and obtaining the one or more new media items comprises obtaining the one or more new media items from at least one of a group consisting of: a local source and a remote source.

10. A system comprising:
an interface providing playback of an active playlist to an associated user; and
a control system having a memory, associated with the interface, wherein the control system is adapted to:
classify a plurality of media items into a plurality of media item groups based on a primary criterion;
identify an active playlist including, for each media item group, a corresponding subset of media items of that group, leaving remaining media items for that group in an underlying pool of media items for that group; and
enable playback of media items of the active playlist such that:
as a media item from the corresponding subset of media items for the first media item group is played sequentially, the corresponding subset of media items for the first media item group is updated with a media item pulled from the underlying pool of media items for the first media item group, and
when a skip command is received, the corresponding subset of media items for the first media item group is not updated with a media item pulled from the underlying pool of media items for the first media item group and skipping through the corresponding subset of media items for the first media item group automatically moves playback to a corresponding subset of media items for a second media item group without having to skip through each media item of the underlying pool of media items for the first media item group.

11. The system of claim 10 wherein the primary criterion comprises a criterion selected from a group consisting of: a score assigned to each of the plurality of media items based on user preferences, a rating assigned to each of the plurality of media items, a time at which each of the plurality of media items was last played by the associated user, a date on which each of the plurality of media items was lasted played, and a date and time on which each of the plurality of media items was last played.

12. The system of claim 10 wherein, in order to classify the plurality of media items, the control system is further adapted to classify the plurality of media items into the plurality of media item groups based on the primary criterion and one or more secondary criteria.

13. The system of claim 10 wherein the control system is further adapted to:
monitor user interactions with the active playlist; and
dynamically update the active playlist based on the user interactions.

14. The system of claim 12 wherein in order to dynamically update the active playlist, the control system is further adapted to pull additional media items from a media item group of the plurality of media item groups in the underlying pool of media items into the active playlist as the associated user consumes media items in the active playlist from the media item group.

15. A central server comprising:
a control system having a memory wherein the control system is adapted to:
classify a plurality of media items into a plurality of media item groups based on a primary criterion;
identify an active playlist including, for each media item group, a corresponding subset of media items of that group, leaving remaining media items for that group in an underlying pool of media items for that group; and
enable playback of media items of the active playlist such that:
as a media item from the corresponding subset of media items for the first media item group is played sequentially, the corresponding subset of media items for the first media item group is updated with a media item pulled from the underlying pool of media items for the first media item group, and
when a skip command is received, the corresponding subset of media items for the first media item group is not updated with a media item pulled from the underlying pool of media items for the first media item group and skipping through the corresponding subset of media items for the first media item group automatically moves playback to a corresponding subset of media items for a second media item group without having to skip through each media item of the underlying pool of media items for the first media item group.

16. A non-transitory computer readable medium storing a computer program, executable by a machine, the computer program comprising executable instructions for:
classifying, by a user device, a plurality of media items into a plurality of media item groups based on a primary criterion;
identify an active playlist including, for each media item group, a corresponding subset of media items of that group, leaving remaining media items for that group in an underlying pool of media items for that group; and enabling, by the user device, playback of media items of the active playlist such that:
  as a media item from the corresponding subset of media items for the first media item group is played sequentially, the corresponding subset of media items for the first media item group is updated with a media item pulled from the underlying pool of media items for the first media item group, and
  when a skip command is received, the corresponding subset of media items for the first media item group is not updated with a media item pulled from the underlying pool of media items for the first media item group and skipping through the corresponding subset of media items for the first media item group automatically moves playback to a corresponding subset of media items for a second media item group without having to skip through each media item of the underlying pool of media items for the first media item group.

* * * * *